United States Patent [19]
Tsuda et al.

[11] Patent Number: 5,114,216
[45] Date of Patent: May 19, 1992

[54] ANTI-LOCK BRAKE SYSTEM HAVING FLOW RESTRICTOR

[75] Inventors: Kazuhiko Tsuda; Hiroyoshi Kako, both of Nagoya; Hirohiko Morikawa, Toyota; Noboru Noguchi, Toyota; Nobuyasu Nakanishi, Toyota, all of Japan

[73] Assignee: Toyota Jidosha Kabushiki Kaisha, Aichi, Japan

[21] Appl. No.: 448,210

[22] Filed: Dec. 8, 1989

[30] Foreign Application Priority Data

Dec. 15, 1988 [JP] Japan .................. 63-316666
Mar. 29, 1989 [JP] Japan .................. 1-78783

[51] Int. Cl.$^5$ .................................. B60T 8/46
[52] U.S. Cl. ..................... 303/117; 303/115 PP; 303/119 R
[58] Field of Search ............ 303/84.1, 84.2, 113, 303/115, 119, 68, 117, 110, 116 R, 116 S P, 113 R, DIG. 1, DIG. 2, DIG. 3, DIG. 4, 115 PP

[56] References Cited

U.S. PATENT DOCUMENTS

| | | | |
|---|---|---|---|
| 4,640,558 | 2/1987 | Nomura et al. | 303/117 |
| 4,957,330 | 9/1990 | Morikawa et al. | 303/119 X |
| 4,964,680 | 10/1990 | Nokubo et al. | 303/117 X |

FOREIGN PATENT DOCUMENTS

| | | | |
|---|---|---|---|
| 0342091 | 11/1989 | European Pat. Off. | 303/84.1 |
| 61-263860 | 11/1986 | Japan . | |
| 62-289459 | 12/1987 | Japan . | |
| 63-45993 | 9/1988 | Japan . | |
| 63-275459 | 11/1988 | Japan . | |
| 64-70253 | 3/1989 | Japan . | |
| 0068251 | 3/1990 | Japan | 303/117 |

*Primary Examiner*—Matthew C. Graham
*Attorney, Agent, or Firm*—Oliff & Berridge

[57] ABSTRACT

An anti-lock brake system for a wheel wherein a fluid pressure is applied to a wheel cylinder, through a solenoid-operated valve device and a flow control device. Upon detection of locking of the wheel, the valve device is brought into an anti-lock state in which the valve device is alternately placed in its pressure-increase and pressure-decrease positions. The flow control device is normally placed in a first mode for a sufficient flow of the fluid into the wheel cylinder, and is operated in a second mode with the valve device placed in the anti-lock state. In the second mode, the flow control device decreases the rate of fluid flow to the wheel cylinder, with an increase in a difference between the power source pressure and the wheel cylinder pressure. An assisting device is provided for enabling the flow control device to adequaely effect the first mode of operation for at least a period between commencement of brake application and commencement of anti-lock operation of the valve device. The assisting device further assists the flow control device to adequately effect the second mode of operation at least while the valve device is in the pressure-increase position during the anti-lock operation of the valve decive.

17 Claims, 9 Drawing Sheets

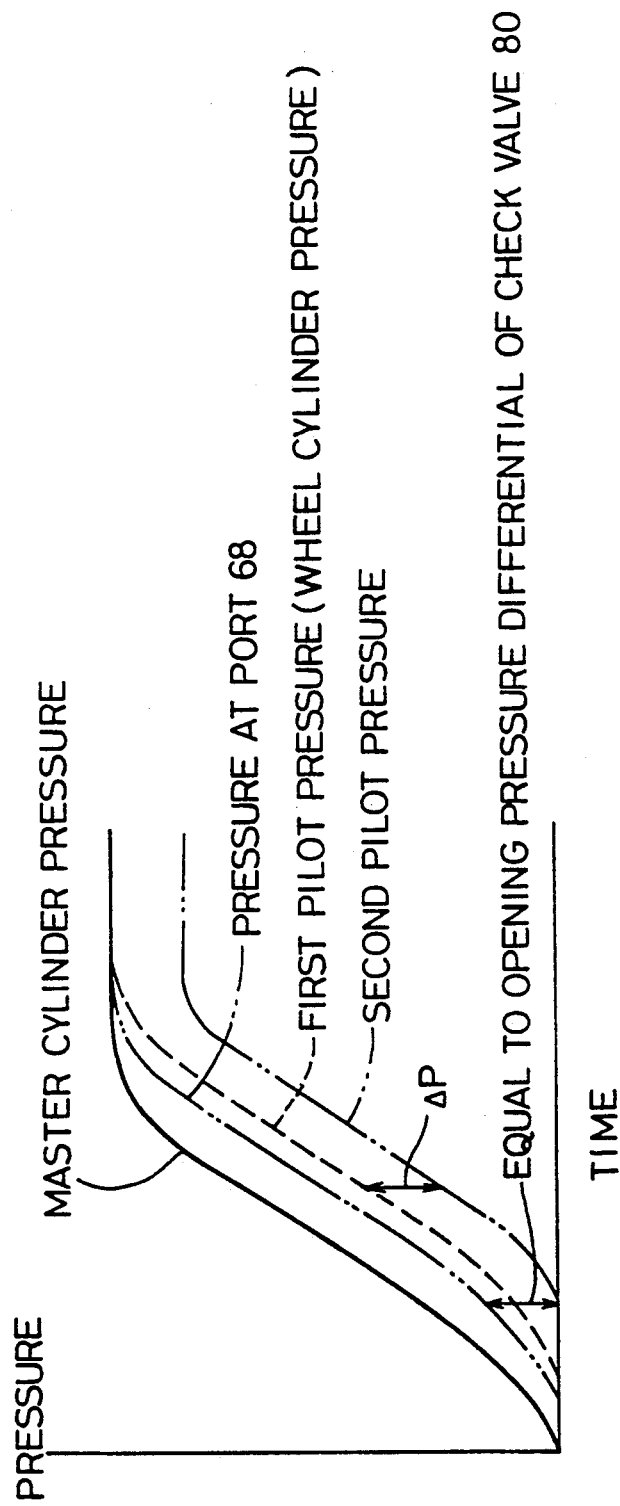

ANTI-LOCK BRAKE SYSTEM HAVING FLOW RESTRICTOR

BACKGROUND OF THE INVENTION

1. Field of the Invention

The present invention relates in general to an anti-lock or anti-skid brake system, and more particularly to improvements in a technique for controlling a flow of a brake fluid from a hydraulic power source to a wheel cylinder for applying brake to a wheel.

2. Discussion of the Prior Art

In the art of applying brake to a wheel of a vehicle, an anti-lock braking device for preventing a locking or skidding condition of the vehicle wheel is known. A typical brake system having such an anti-lock braking device generally includes a master cylinder for generating a pressurized fluid, a wheel cylinder for applying brake to the wheel, a reservoir for accommodating the brake fluid discharged from the wheel cylinder, and a solenoid-operated valve device disposed between the master cylinder and the wheel cylinder and between the wheel cylinder and the reservoir. The pressure of the fluid delivered from the master cylinder varies with an operating amount or force of a brake pedal or other operating member. The solenoid-operated valve device is controlled for automatic regulation of the pressure in the wheel cylinder.

The solenoid-operated valve device may be a three-position valve having a pressure-increase position, a pressure-decrease position, and a pressure-hold position. In the pressure-increase position, the valve device disconnects the wheel cylinder from the reservoir and permits fluid communication of the wheel cylinder to the master cylinder. In the pressure-decrease position, the wheel cylinder is disconnected from the master cylinder and is held in fluid communication with the reservoir. In the pressure-hold position, the wheel cylinder is disconnected from both the master cylinder and the reservoir. Alternatively, the solenoid-operated valve device may be a two-position valve which does not have the pressure-hold position. Further, the valve device may be a combination of two or more valves, for example, two solenoid-operated shut-off valves, one of which is disposed between the master and wheel cylinders, and the other of which is between the wheel cylinder and the reservoir. Another example of the combination valve device consists of a solenoid-operated directional control valve and a solenoid-operated shut-off valve.

The solenoid-operated valve device of any type is controlled by an electric control device utilizing a computer. Generally, the control device controls the valve device such that the valve device is normally placed in the pressure-increase position permitting the wheel cylinder pressure to increase, and such that the valve device operates in an anti-lock state when there arises a skidding or locking of the vehicle wheel. In the anti-lock state, the pressure in the wheel cylinder is alternately increased and decreased with the valve device placed alternately in the pressure-increase and pressure-hold positions, so that the slip ratio of the wheel is maintained within a predetermined range.

It is recognized that the rate or gradient of the pressure increase of the wheel cylinder during an anti-lock operation of the valve device is preferably regulated for optimally or accurately controlling the wheel cylinder pressure. To this end, it is proposed to suitably determine the time intervals at which the valve device is switched between the pressure-increase position and the pressure-decrease position (or pressure-hold position). It is also proposed to adjust the time length during which the valve device is held in the pressure-increase position in each control cycle, as needed. These proposals are not completely satisfactory in attaining a sufficient result in terms of the pressure control accuracy of the valve device operating in the anti-lock state. Specifically, upon switching of the valve device into the pressure-increase position during the anti-lock operation, the rate of flow of the brake fluid through the valve device significantly varies depending upon a pressure difference between the pressures on the upstream and downstream sides of the valve device. In other words, the amount of increase in the wheel cylinder pressure per unit time of operation in the pressure-increase position considerably fluctuates with the above-indicated pressure difference.

In light of the above drawback, the assignee of the present application developed an anti-lock brake system having a recirculating type anti-lock braking arrangement which is provided with a hydraulic pump, in addition to the master cylinder, wheel cylinder, reservoir, solenoid-operated valve device and electric control device, which have been described above. The pump is activated upon commencement of the anti-lock operation of the valve device in the anti-lock state, so that the fluid is returned by the pump from the reservoir back to the master cylinder. This brake system includes a pilot-operated variable flow control device which is disposed in a fluid passage between the master and wheel cylinders. The flow control device is adapted to receive as pilot pressures the master cylinder pressure and the wheel cylinder pressure, and operate so as to reduce the area of fluid flow therethrough (amount of fluid flow through the fluid passage) toward the wheel cylinder. The fluid flow is reduced with an increase in the difference between the two pilot pressures, and with an increase in the wheel cylinder pressure. The brake system of this type is described as one embodiment of the invention disclosed in Japanese Patent Application No. 63-45423 (which had not been laid open at the time of the priority date claimed in this application), the subject matter of which is disclosed in U.S. patent application Ser. No. 307,481 filed Feb. 8, 1989 (assigned to the assignee of the present application) which issued as U.S. Pat. No. 4,957,330 to Morikawa et al.

The brake system referred to above performs an anti-lock braking operation in which the rate of fluid flow from the master cylinder toward the wheel cylinder is suitably regulated when the solenoid-operated valve device in the anti-lock state is switched into the pressure-increase position. Namely, the fluid flow into the wheel cylinder upon switching of the valve device into the pressure-increase position is accurately controlled so that the wheel cylinder pressure is raised at an optimum rate suitable for the anti-lock braking operation, irrespective of the level of the wheel cylinder pressure which should correspond to the friction coefficient of the road surface, and the level of the master cylinder pressure which corresponds to the operating amount or force of the brake operating member.

However, the present applicants recognized a further room for improvement of the brake system discussed above, in connection with the manner of operation when the brake operating member is operated either comparatively slowly and abruptly. Described more particularly, where brake is slowly applied to the wheel by a relatively slow operation of the operating member, the wheel cylinder pressure is raised such that the wheel cylinder pressure is held substantially equal to the master cylinder pressure. In this instance, there arises substantially no pressure difference between the two pilot pressures of the variable flow control device. Where the braking to the wheel occurs relatively abruptly with a relatively rapid operation of the operating member, on the other hand, the wheel cylinder pressure tends to be considerably lower than the master cylinder pressure, due to a resistance to the flow of the fluid through the flow control device. In a normal braking operation with the solenoid-operated valve device held in the pressure-increase position, it is required that the rate of flow of the fluid into the wheel cylinder should be sufficiently high. However, the rapid operation of the operating member causes considerable reduction in the area of fluid flow through the flow control device, because of the considerably large difference between the two pilot pressures, whereby the rate of fluid flow into the wheel cylinder is insufficiently high. As a result, the actual braking effect is delayed, or the response of the brake system to the operation of the operating member is deteriorated.

SUMMARY OF THE INVENTION

It is therefore an object of the present invention to provide an anti-lock brake system which is substantially free of a delay in a normal braking operation.

The above object may be achieved according to the principle of the present invention, which provides an anti-lock brake system comprising:

(a) a hydraulic power source; (b) a wheel cylinder for applying brake to a wheel; (c) a solenoid-operated valve device disposed between the power source, and the wheel cylinder and a reservoir, and operable between a pressure-increase position thereof for fluid communication between the wheel cylinder and the power source, and a pressure-decrease position thereof for fluid communication between the wheel cylinder and the reservoir; (d) an electric control device electrically connected to the solenoid-operated valve device, for controlling the valve device so as to normally hold the valve device in the pressure-increase position, and upon detection of a locking state of the wheel, place the valve device in an anti-lock state in which the valve device is alternately placed in the pressure-increase and pressure-decrease positions for increasing and decreasing a fluid pressure in the wheel cylinder and thereby maintaining a slip ratio of the wheel within a predetermined range; (e) a flow control device normally operated in a first state for effecting a first mode of operation to allow a relatively large rate of flow of a fluid from the power source toward the wheel cylinder, and brought into a second state for effecting a second mode of operation when the valve device is placed into the anti-lock state, the flow control device in the second mode of operation decreasing the rate of flow of the fluid with an increase in a pressure difference by which a pressure in the power source is higher than a pressure in the wheel cylinder; and (f) assisting means for enabling the flow control device to effect the first mode of operation in a required manner for at least a first period between commencement of brake application to the wheel and commencement of an operation of the solenoid-operated valve device in the anti-lock state, and enabling the flow control device to effect the second mode of operation in a required manner for at least a second period during which the valve device is placed in the pressure-increase position during the operation of the valve device in the anti-lock state.

In the anti-lock brake system of the present invention constructed as described above, the assisting means assists the flow control device in performing its predetermined function during the first period. Namely, the assisting means enables the flow control device to effect the first mode of operation in the required manner for allowing a relatively large rate of flow of the fluid toward the wheel cylinder, during the period after the brake application is commenced and before the solenoid-operated valve device enters the anti-lock mode of operation, even if there exists a situation that would prevent the flow control device from adequately performing the first mode of operation, without the assistance of the assisting means.

Accordingly, for at least the period between the commencement of brake application to the wheel and the commencement of the anti-lock pressure control operation of the solenoid-operated valve device, the assisting means assures a sufficiently rapid increase in the pressure in the wheel cylinder, with the flow control device placed in the first mode. This eliminates an otherwise possible delay of the wheel cylinder in providing effective braking to the wheel, with respect to the time of commencement of a braking operation by a suitable brake operating member. Further, the assisting means assists the flow control device in adequately performing the second mode of operation for at least the period during which the solenoid-operated valve device is placed in the pressure-increase position during the anti-lock pressure control operation of the valve device. Accordingly, the assisting means permits the pressure in the wheel cylinder to be raised at the predetermined optimum rate in each operation of the valve device in the pressure-increase position in each anti-lock pressure control cycle of the wheel cylinder.

In one form of the present invention, the flow control device has a first pilot chamber which receives as a first pilot pressure the pressure in the wheel cylinder, and a second pilot chamber which receives as a second pilot pressure a pressure in one of two portions of a fluid passage connecting the power source and the solenoid-operated valve device. The two portions of the fluid passage consist of a first portion connecting the power source and the flow control device and a second portion connecting the flow control device and the valve device. The flow control device is placed in the first state to effect the first mode of operation while the second pilot pressure is not higher than the first pilot pressure, and is placed in the second state to effect the second mode of operation while the second pilot pressure is higher than the first pilot pressure. In this form of the invention, the assisting means is adapted to operate, for at least the first period, to hold the second pilot pressure at a level not higher than the first pilot pressure, even if there arises a pressure difference between the pressures in the above-indicated one of the two portions of the fluid passage and in the wheel cylinder, which pressures should be substantially equal to each other. The assisting means operates, for at least the second period, to hold the first and second pilot pressures at respective levels substantially equal to the pressures in the wheel cylinder and the power source, respectively.

In the above form of the invention, the assisting means may comprise pressure reducing means provided in a pilot passage through which the pressure in the above-indicated one of the two portions of the fluid passage is applied to the second pilot chamber of the flow control device. This pressure reducing means reduces the pressure in the above-indicated one of the two portions by an amount larger than an amount by which the pressure in the wheel cylinder is lower than the pressure in the above-indicated one of the two portions when the fluid flows into the wheel cylinder through the valve device placed in the pressure-increase position and the flow control device. Where the hydraulic power source is a master cylinder, it is required that the amount of pressure reduction by the pressure reducing means be larger than a difference between the pressure in the above-indicated one of the two portions of the fluid passage and the pressure in the wheel cylinder, which difference is produced when a brake operating member is operated at a highest speed. While the above amount of pressure reduction is necessary in order to permit the assisting means to always fulfil its assigned function, the amount of pressure reduction provided by the pressure reducing means may be smaller than the above amount. The pressure reducing means may consist of a shut-off valve which is opened when the pressure in the above-indicated one of the two portions of the fluid passage is higher than the pressure in the wheel cylinder by the above-indicated amount.

Where a shut-off valve is used as the pressure reducing means of the assisting means, the shut-off valve is held closed for at least the first period indicated above, and is held open for at least the second period indicated above.

Alternatively, the assisting means may comprise flow restrictor means provided in a pilot passage through which the pressure in the above-indicated one of the two portions of the fluid passage is applied to the second pilot chamber of the flow control device. The flow restrictor means is adapted to restrict a flow of the fluid through the pilot passage and thereby delay an increase in the second pilot chamber.

In the same form of the invention wherein the flow control device has the first and second pilot chambers, the flow control device may comprise a pilot-operated variable flow restricting valve which includes a housing, and a valve member which is substantially fluid-tightly, and slidably received in the housing, so as to cooperate with the housing to define the first and second pilot chambers. The valve member is moved based on the first and second pilot pressures, and has a non-operated position for maximizing an area of fluid flow through the flow control device from the power source toward the wheel cylinder, and a fully restricting position. The valve member is placed in the non-operated position while the second pilot pressure is not higher than the first pilot pressure. The valve member is moved in a forward direction from the non-operated position toward the fully restricting position by a distance which increases with an increase in a difference between the first and second pilot pressures, so that the area of fluid flow decreases with an increase in the distance, while the first pilot pressure is lower than the second pilot pressure.

In the above case, the assisting means may comprise pressure reducing means provided in a pilot passage through which the pressure in the above-indicated one of the two portions of the fluid passage is applied to the second pilot chamber of the flow restricting valve. The pressure reducing means reduces the pressure in the above-indicated one of the two portions by an amount larger than an amount by which the pressure in the wheel cylinder is lower than the pressure in the above-indicated one of the two portions when the fluid flows into the wheel cylinder through the solenoid-operated valve device placed in the pressure-increase position and the flow restricting valve. In this instance, the valve member of the variable flow restricting valve may have a communication passage for fluid communication between the second pilot chamber and the one of the two portions of the fluid passage, so that the pressure reducing means is disposed in the communication passage.

In the case where the flow control device comprises the variable flow restricting valve indicated above, the flow control device may further comprise a shut-off valve disposed in parallel with the pilot-operated variable restrictor valve. In this instance, the shut-off valve is held open for at least the first period, and held closed for at least the second period. Provided that this shut-off valve alone permits a sufficient rate of flow of the fluid toward the wheel cylinder when the shut-off valve is open, the pressure in the wheel cylinder may be increased at a sufficiently high rate, and an otherwise possible delayed braking operation may be avoided, even if the flow restricting valve restricts the fluid flow toward the wheel cylinder. Therefore, the brake system may be adapted such that the pressures in the wheel cylinder and the power source are always applied as the first and second pilot pressures to the flow restricting valve, while the assisting means is adapted to enable the shut-off valve to fulfil its function, i.e., to be placed in the open and closed positions for the first and second periods, respectively. The present arrangement using the shut-off valve in addition to the flow restricting valve permits easy designing of the maximum area or rate of flow of the fluid through the flow control device.

The shut-off valve provided in addition to the flow restricting valve may be held open while the second pilot pressure is not higher than the first pilot pressure, and held closed while the first pilot pressure is lower than the second pilot pressure. The assisting means may be adapted to control the pilot pressures of the flow restricting valve and the shut-off valve such that the same pilot pressures are always applied to both of these valves. However, the assisting means may be adapted such that the different pilot pressures are applied to the two valves, for a certain period of operation of the brake system.

Where the pilot-operated variable flow restricting valve as described above is provided, the brake system may further comprise anti-sticking means for preventing the valve member of the flow restricting valve from being stuck in the housing. The anti-sticking means is adapted to move the valve member without influencing a braking operation while the solenoid-operated valve device is placed in the pressure-increase position, and without influencing a braking operation while the valve device is placed in the anti-lock state.

In an anti-lock brake system in general, the valve member of a flow control device is held stationary while the brake system is at rest or is applying normal braking to the wheel. That is, the valve member is moved only when the solenoid-operated valve device is operated in the anti-lock state. In other words, the second pilot pressure of the flow restricting valve does not exceed the first pilot pressure and the valve member is not moved in the forward direction when the brake system is off or normal brake is applied to the wheel. The second pilot pressure may exceed the first pilot pressure, causing the valve member to move in the forward direction during the anti-lock pressure control operation of the solenoid-operated valve device. The anti-lock pressure control operation may not be effected for a considerably long time under certain running conditions of the vehicle. This results in the valve member of the flow control device being held at the same position for a long time, leading to possible sticking of the valve member in the housing, due to the presence of water contained in the brake fluid.

The anti-sticking means provided in the above arrangement eliminates the sticking of the valve member of the flow restricting valve, since the valve member is positively moved when the valve device is brought into the pressure-increase position during normal braking. This movement of the valve member does not reduce the fluid flow through the flow restricting valve.

In the above arrangement, the anti-sticking means may comprise means for permitting the valve member to move in a reverse direction opposite to the forward direction when the first pilot pressure becomes higher than the second pilot pressure, due to reduction of the second pilot pressure from a level of the pressure in the power source while the solenoid-operated valve device is placed in the pressure-increase position before the valve device is placed in the anti-lock state. In this case, the anti-sticking means further includes means for permitting the flow control device to maintain the maximum area of fluid flow obtained with the valve member placed in the non-operated position, even when the valve member is moved in the reverse direction from the non-operated position.

Where the flow control device has the first and second pilot chambers, and the hydraulic power source comprises a master cylinder which delivers a pressurized fluid in response to an operation of a brake operating member, the brake system may further comprise a pump for returning to the master cylinder the fluid discharged from the wheel cylinder to the reservoir through the solenoid-operated valve device. In this instance, the second pilot chamber may be adapted to receive as the second pilot pressure a delivery pressure of the pump as well as the pressure in the above-indicated one of the two portions of the fluid passage. The flow control device is changed from the first state to the second state when the delivery pressure applied to the second pilot chamber increases to a level near the pressure in the master cylinder applied to the first pilot chamber as the first pilot pressure. In the present arrangement, the assisting means includes means for applying the second pilot pressure to the second pilot chamber to change the flow control device from the first state to the second state at an optimum point of time even before the delivery pressure of the pump has increased to the level near the pressure in the master cylinder during the second period. This brake system is free from a delay of switching of the flow control device from the first state to the second state due to a delayed increase of the delivery pressure to the level near the pressure in the master cylinder.

In the above arrangement, the flow control device may comprise a pilot-operated variable flow restricting valve constructed as described above, and/or the assisting means may comprise pressure reducing means provided in a pilot passage through which the pressure in the above-indicated one of the two portions of the fluid passage is applied to the second pilot chamber of the flow control device. The pressure reducing means is adapted to reduce the pressure in the above-indicated one of the two portions of the fluid passage by an amount larger than an amount by which the pressure in the wheel cylinder is lower than the pressure in the above-indicated one of the two portions when the fluid flows into the wheel cylinder through the valve device placed in the pressure-increase position and the flow control device. Alternatively, the assisting means may comprise flow restrictor means provided in a pilot passage through which the pressure in the above-indicated one of the two portions of the fluid passage is applied to the second pilot chamber of the flow control device. The flow restrictor means is adapted to restrict a flow of the fluid through the pilot passage and thereby delay an increase in the second pilot chamber.

In the anti-lock brake system having the flow control device and the pressure reducing means or flow restrictor means, the second pilot pressure will not exceed the first pilot pressure, and the flow control device will not excessively reduce the fluid flow toward the wheel cylinder, while the solenoid-operated valve device is placed in the pressure-increase position during normal braking. Hence, the present brake system is free of a delayed braking effect. Further, since the pressure in the master cylinder is applied to the flow control device, the accuracy of controlling the wheel cylinder pressure upon commencement of an anti-lock pressure control operation of the valve device will not be deteriorated even if the operation of the pump for returning the fluid from the wheel cylinder back to the master cylinder is somewhat delayed with respect to the initiation of the anti-lock pressure control operation.

In the case where the assisting means utilizes the pressure reducing means as described above, it is inevitable to avoid a certain amount of pressure drop of the second pilot pressure with respect to the master cylinder pressure. After the operation of the pump is initiated, the delivery pressure of the pump becomes substantially equal to the master cylinder pressure. Therefore, it is desirable to apply the delivery pressure of the pump to the second pilot chamber of the flow control valve, for improved accuracy of control of the fluid flow by the flow control device after the pump is started. While the delivery pressure of the pump is raised to a level substantially equal to the master cylinder pressure a certain short time after the pump is commanded to start, the delivery pressure may not reach the master cylinder pressure upon the first pressure increase operation with the solenoid-operated valve device placed in the anti-lock state. At this time, the flow control device cannot function in the required manner. To avoid this, the pressure reducing means is preferably provided also in the case where the delivery pressure of the pump is applied as the second pilot pressure to the flow control device.

In the case where the assisting means utilizes the flow restrictor means as described above, it takes a certain time for the second pilot pressure of the flow control device to be raised to the master cylinder pressure. Sometimes, the delivery pressure of the pump may reach the master cylinder pressure before the pressure in the second pilot chamber reaches the master cylinder pressure. In this sense, it is desirable that the delivery pressure of the pump be applied as the second pilot pressure to the second pilot chamber of the flow control device.

In another form of the present invention, the flow control device comprises means for decreasing an area of fluid flow therethrough with an increase in a pressure difference by which the pressure in the power source is higher than the pressure in the wheel cylinder, as well as with an increase in the pressure in the wheel cylinder. In this case, the flow control device may comprise a pilot-operated variable flow restricting valve which includes (a) a housing having a stepped bore including a large-diameter hole, a small-diameter hole, and a shoulder surface between the large-diameter and small-diameter holes, (b) a stepped control piston having a large-diameter portion, a small-diameter portion, and a shoulder surface between the large-diameter and small-diameter portions, the control piston being fluid-tightly and slidably received in the stepped bore, the control piston and the housing cooperating with each other to define a first pilot chamber in the small-diameter hole, a second pilot chamber in the large-diameter hole, and an atmospheric pressure chamber between the shoulder surfaces of the housing and the control piston, the control piston reducing an area of fluid flow therethrough in direction from the power source toward the wheel cylinder when the control piston is moved in the stepped bore in a direction from the second pilot chamber toward the first pilot chamber, and (c) an elastic member for biasing the stepped control piston in a direction from the first pilot chamber toward the second pilot chamber.

BRIEF DESCRIPTION OF THE DRAWINGS

The above and other objects, features and advantages of the present invention will be better understood by reading the following detailed description of some presently preferred embodiments of the invention, when considered in connection with the accompanying drawings, in which:

FIG. 12 is a graph indicating variation in the master cylinder pressure, wheel cylinder pressure and other pressures, in the brake system of FIG. 11.

DETAILED DESCRIPTION OF THE PREFERRED EMBODIMENTS

With reference to the accompanying drawings, there will be described in detail some presently preferred embodiments of the invention in the form of an anti-lock brake system for a 4-wheel motor vehicle, which uses a solenoid-operated two-position valve device.

Figure 1:
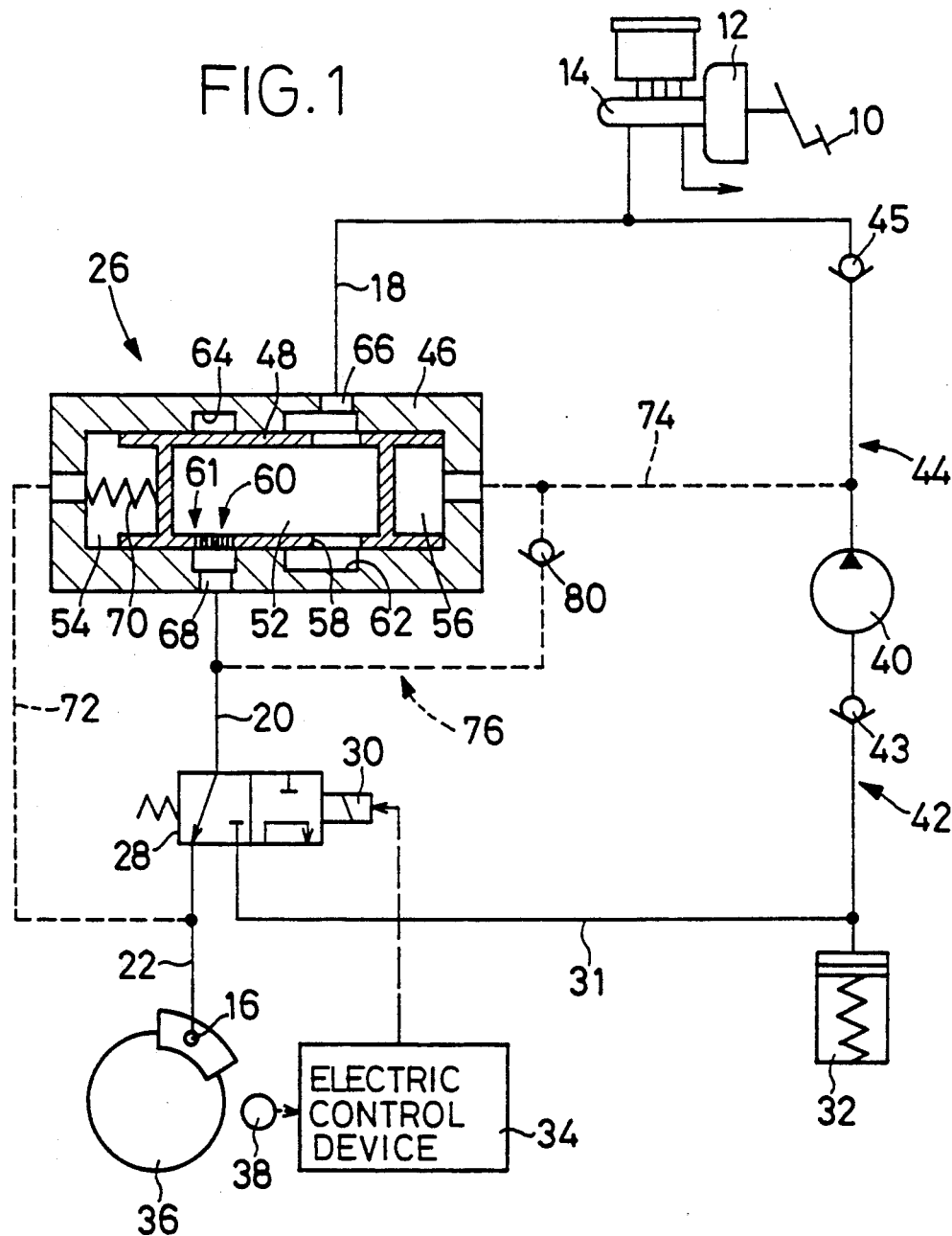
FIG. 1 is a schematic view of one embodiment of an anti-lock brake system of the present invention, including an elevational view in cross section of a variable flow control device used in the brake system.

Referring first to FIG. 1, reference numeral 10 denotes a brake operating member in the form of a brake pedal operatively connected to a master cylinder 14 through a booster 12. The master cylinder 14 has two mutually independent pressurizing chambers for pressurizing a brake fluid to the same level, which varies with an operating force acting on the brake pedal 10. The fluid pressure generated by one of the two pressurizing chambers is applied to wheel cylinders of front brakes for left and right front wheels of the vehicle, while the fluid pressure generated by the other pressurizing chamber is applied to wheel cylinders of rear brakes for left and right rear wheels of the vehicle.

In FIG. 1, only the left front wheel cylinder is shown at 16, by way of example, in the interest of brevity and simplification. This wheel cylinder 16 is connected to the master cylinder 14, through a hydraulic line which includes fluid passages 18, 20, 22. The brake system employs a pilot-operated variable flow restricting valve 26 connected to the master cylinder 14 through the fluid passage 18, and a solenoid-operated two-position valve 28 which is connected to the restricting valve 26 through the fluid passage 20 and to the wheel cylinder 16 through the fluid passage 22.

The two-position valve 28 is normally held in its pressure-increase position as indicated in FIG. 1, in which the fluid passages 20 and 22 communicate with each other to allow the pressure of the master cylinder 14 to be applied to the wheel cylinder 16. When a solenoid 30 of the two-position valve 28 is energized, the valve 28 is brought into its pressure-decrease position in which the fluid passages 20 and 22 are disconnected from each other while the fluid passage 22 communicates with a reservoir passage 31 leading to a reservoir 32, so that the fluid discharged from the wheel cylinder 16 is accommodated in the reservoir 32.

The solenoid 30 of the two-position valve 28 is controlled by an electric control device 34, which receives a speed signal generated by a wheel speed sensor 38 which detects the rotating speed of a disc rotor 36 of the left front wheel. The speed signal is indicative of the rotating speed of the left front wheel. The brake system further has speed sensors for detecting the speeds of the other wheels of the vehicle. The electric control device 34 computes the slip ratio of the left front wheel based on the speed signals from the speed sensor 38 and other speed sensors, and controls the solenoid 30 of the two-position valve 28 so that the slip ratio of the left front wheel is held within a predetermined optimum range.

The brake fluid discharged from the wheel cylinder 16 into the reservoir 32 with the two-position valve 28 switched to the pressure-decrease position is pumped by a pump 40 through a pump passage 42 and a check valve 43, and is returned back to the fluid passage 18 through a pump passage 44 and a check valve 45. The pressure difference on the opposite sides of each check valve 43, 45, at which the check valve is opened, is so small that it is practically negligible.

The pilot-operated variable flow restricting valve 26 is provided with a valve member in the form of a control piston 48 which is substantially fluid-tightly, and slidably received in a bore formed through a housing 46. The control piston 48 is a cylindrical member which cooperates with the housing 46 to define a fluid chamber 52, a first pilot chamber 54 and a second pilot chamber 56, such that the fluid chamber 52 is disposed between the first and second pilot chambers 54, 56 in the axial direction of the control piston 48. The control piston 48 has a cylindrical wall through which large through-holes 58 are formed. The cylindrical wall of the piston 48 further has a plurality of small through-holes 60 which are spaced apart from each other in the axial direction. The piston 48 also has a multiplicity of small apertures 61 formed through the cylindrical wall, at an axial position adjacent to the small through-hole 60 which is nearest to the first pilot chamber 54. The small apertures 61 are spaced apart from each other in the circumferential direction of the piston 48.

On the other hand, the housing 46 has annular grooves 62, 64 formed in its inner surface defining the bore. The two grooves 62, 64 are spaced from each other in the axial direction of the control piston 48, and communicate with respective ports 66, 68 which are connected to the fluid passages 18, 20, respectively. While the control piston 48 is held in its original or non-operated position of FIG. 1 under the biasing force of a spring 70, the large through-holes 58 are held in fluid communication with the annular groove 62, while all of the small through-holes 60 and small apertures 61 are held in fluid communication with the annular groove 64. When the control piston 48 is advanced in the forward direction by a given distance against the biasing force of the spring 70, all the small apertures 61 are displaced and disconnected from the annular groove 64, while the small through-holes 60 remain communicating with the groove 64. As the control piston 48 is further advanced from this position, the small through-holes 60 are disconnected from the annular groove 64, one by one.

It will be understood that the flow restricting valve 26 performs substantially no fluid flow restriction while its control piston 48 is placed in its non-operated position, and starts restricting the fluid flow therethrough when the control piston 48 has been advanced by the predetermined distance. As the piston 48 is further advanced, the area of fluid flow from the port 66 and fluid chamber 52 into the port 68 decreases as the advancing distance increases. Thus, the rate of fluid flow from the fluid passage 18 into the fluid passage 20 and the two-position valve device 28 is reduced by the advancing movement of the control piston 48 of the flow restricting valve 26.

The first pilot chamber 54 of the flow restricting valve 26 communicates with the fluid passage 22 through a pilot passage 72, while the second pilot chamber 56 communicates through a pilot passage 74 with a part of the pump passage 44 between the pump 40 and the check valve 45. In this arrangement, the control piston 48 operates based on the pressure difference between the first and second pilot pressures in the first and second pilot chambers 54, 56, so as to regulate the rate of fluid flow through the valve 26.

The pilot passage 74 is connected to the fluid passage 20 through a pilot passage 76. This passage 76 is provided with pressure reducing means in the form of a check valve 80, which allows the fluid flow in the direction from the fluid passage 20 toward the pilot passage 74, but inhibits the fluid flow in the opposite direction. The pressure difference on the opposite sides of the check valve 80, at which the check valve 80 is opened, is set to be substantially equal to a pressure difference $\Delta P$ which is estimated to exist between the pressures in the two fluid passages 20 and 22 due to a resistance to the fluid flow through the two-position valve 28 when the operating speed of the brake pedal 10 is a maximum or highest value. The above-indicated pressure difference of the check valve 80 will be hereinafter referred to as "opening pressure difference", when appropriate. The function of this check valve 80 will be described later in greater detail.

In the anti-lock brake system of the recirculating type constructed as described above, the solenoid-operated two-position valve 28 is normally held in the pressure-increase position of FIG. 1, and there is developed no pressure in the fluid passages 18 and 20, in a portion of the pump passage 44 between the check valve 45 and the fluid passage 18, and in a portion of the pilot passage 76 between the check valve 80 and the fluid passage 20. Since the pump 40 is normally at rest, no pressure is developed in a portion of the pump passage 44 between the check valve 45 and the pump 40, in the pilot passage 74, and in a portion of the pilot passage 76 between the check valve 80 and the pilot passage 74. Further, no effective pilot pressures are applied to the first and second pilot chambers 54, 56, whereby the control piston 48 is held in its fully retracted position or non-operated position in which the small through-holes 60 and small apertures 61 are all held in communication with the annular groove 64 so that the area of fluid flow through the vale 26 is at its maximum.

If the brake pedal 10 is operated relatively slowly or the operating force increases at a relatively low rate in the above-indicated condition, the pressures in the fluid passages 20 and 22 are raised without a substantial difference therebetween. The pressure in the fluid passage 20 is imparted to the second pilot chamber 56 of the variable flow restricting valve 26, with an amount of pressure reduction substantially equal to the opening pressure difference of the check valve 80. That is, the second pilot pressure applied to the second pilot chamber 56 based on the pressure in the fluid passage 20 is lower than the pressure in the passage 20, by an amount substantially equal to the pressure difference on the opposite sides of the valve 80 at which the valve 80 begins to open. On the other hand, the check valve 45 inhibits the pressure in the fluid passage 18 from being imparted to the second pilot chamber 56. Consequently, the first pilot pressure in the first pilot chamber 54 becomes higher than the second pilot pressure in the second pilot chamber 56, whereby the control piston 48 of the restricting valve 26 remains in the non-operated fully retracted position. Thus, the pressurized brake fluid delivered from the master cylinder 14 is supplied to the wheel cylinder, via the fluid passage 18, restricting valve 26, fluid passage 20, two-position valve 28 and fluid passage 22. Since the restricting valve 26 is in the non-operated position, the wheel cylinder 16 is rapidly supplied with the brake fluid, whereby the braking operation is not delayed.

If the brake pedal 10 is abruptly depressed, the pressure in the fluid passage 20 becomes higher than that in the fluid passage 22, due to the resistance of the two-position valve 28 to the fluid flow through the valve 28. In the present embodiment, however, the check valve 80 functions so that the second pilot pressure in the second pilot chamber 56 of the flow restricting valve 26 is made lower than the pressure in the fluid passage 20, by an amount equal to the pressure difference $\Delta P$ by which the pressure in the fluid passage 20 is considered to be higher than the pressure in the fluid passage 22 when the brake pedal 10 is most rapidly or abruptly operated. Further, the pressure in the fluid passage 18 is inhibited by the check valve 45 from being applied to the second pilot chamber 56. In this condition, therefore, the first pilot pressure in the first pilot chamber 54 is almost equal to or higher than the second pilot pressure in the second pilot chamber 56, whereby the control piston 48 is maintained in the non-operated position for non-restricted flow of the fluid toward the wheel cylinder 16. Thus, the present brake system permits the wheel cylinder 16 to be rapidly supplied with the brake fluid, with a sufficiently high rate of flow of the brake fluid from the master cylinder 14 to the wheel cylinder 16, even when an abrupt braking is applied to the wheel. In this manner, a delayed braking effect and a resulting increase in the braking distance of the vehicle can be avoided.

Where the pressure in the wheel cylinder 16 is higher than an optimum level corresponding to the friction coefficient of the road surface on which the relevant left front wheel is running, the slip ratio of the wheel exceeds the upper limit of the predetermined range. In this event, the electric control device 34 determines based on the output signals of the speed sensors including the sensor 38, that the left front wheel begins to suffer from an excessively locking or skidding condition. When this determination is made, the control device 34 commands the solenoid-operated two-position valve 28 to commence an anti-lock operation, by first placing the valve 28 in a pressure-decrease mode. In this mode, the valve 28 is held in its pressure-decrease position until the excessively locking tendency of the wheel is removed, as described below.

Consequently, a portion of the fluid mass in the wheel cylinder 16 is discharged into the reservoir 32 through the reservoir passage 31. In the present embodiment, the pump 40 is commanded to be turned on at the time when the two-position valve 28 is commanded to be brought to the pressure-decrease position. But, there exist electric and mechanical delay factors in the system, which cause a time lag before the activation of the pump 40 results in raising the pressures in the pilot passage 74 and the portion of the pilot passage 76 between the check valve 80 and the passage 74, to the level equal to the pressure in the fluid passage 18. However, even before the pump 40 starts to practically function to raise the second pilot pressure to the level of the fluid passage 18, the pressure in the fluid passage 20 is applied to the second pilot chamber 56 through the check valve 80, with the pressure reduction corresponding to the opening pressure difference of the check valve 80 as explained above. While the second pilot pressure based on the pressure in the passage 20 is not completely equal to the pressure in the master cylinder 14, the second pilot pressure almost reaches the master cylinder pressure. When the two-position valve 28 is placed in the pressure-decrease position for the first time after the valve 28 is placed in the anti-lock control state, the amount of pressure reduction in the wheel cylinder 16 is usually larger than the opening pressure difference of the check valve 80. Therefore, the second pilot pressure in the second pilot chamber 56 (i.e, the pressure in the fluid passage 20 minus the opening pressure difference of the check valve 80) eventually exceeds the pressure in the fluid passage 22 (i.e., the first pilot pressure in the first pilot chamber 54), by an amount corresponding to the biasing force of the spring 70, whereby the control piston 48 is advanced from the non-operated position by a given distance, so that the small apertures 61 are disconnected from the annular groove 64. Finally, the control piston 48 is advanced to a position which is determined by the specific difference between the pressures in the master cylinder 14 and the wheel cylinder 16.

With the two-position valve 28 held in the pressure-decrease position (in the pressure-decrease mode) for a given time period, the pressure in the wheel cylinder 16 is lowered to a level at which the slip ratio of the left front wheel becomes lower than the upper limit. The removal of the excessively locking tendency is determined by the electric control device 34, based on the speed signals from the speed sensors such as the sensor 38. When the control device 34 determines that the excessively locking tendency of the wheel has been removed, the control device commands the two-position valve 28 to be brought into a pressure-hold mode in which the valve 28 is alternately placed in its pressure-increase and pressure-decrease positions at predetermined time intervals. In this pressure-hold mode, the pressure in the wheel cylinder 16 can be maintained substantially constant.

During a period in the pressure-hold mode before the pump 40 starts to substantially function, that is, during a period (indicated at I in the graph of FIG. 2) before the pressure in the pump passage 44 is not raised above the level of the pressure in the fluid passage 20 minus the opening pressure difference of the check valve 80, the distance of advancing movement of the control piston 48 of the flow restricting valve 26 increases with an increase in a difference between the pressure in the fluid passage 22, and the pressure in the fluid passage 20 minus the opening pressure difference of the check valve 80. Namely, the number of the small through-holes 60 of the control piston 48 which are disconnected from the annular groove 64 increases and the amount of flow of the fluid through the valve 26 decreases as a function of the difference between the first and second pilot pressures in the first and second pilot chambers 54, 56. Accordingly, the fluid flows into the wheel cylinder 16 at a rate which is almost equal to the predetermined nominal value which is determined by or corresponds to the pressure difference between the master cylinder 14 and the wheel cylinder 16, even where there exists a pressure difference between the fluid passages 20 and 22. If the two-position valve 28 is switched into the pressure-increase position in this condition, the pressure in the wheel cylinder 16 can be raised substantially at the predetermined rate. That is, the pressure in the wheel cylinder 16 can be controlled in the required manner.

When the pump 40 starts to substantially function, the pressure in the pump passage 44 is increased for a short period (indicated at II in the graph of FIG. 2), and the flow restricting valve 26 starts to regulate the area of fluid flow therethrough, based on the difference between the delivery pressure of the pump 40 and the pressure in the fluid passage 22. After the delivery pressure of the pump 40 is raised to a level substantially equal to the pressure in the master cylinder 14, as indicated at III in FIG. 2, the flow restricting valve 26 starts to regulate the area of fluid flow therethrough based on the pressure difference between the master cylinder 14 and the wheel cylinder 16. In this condition, the fluid is fed to the wheel cylinder 16 at the predetermined nominal rate, irrespective of the pressures in the master and wheel cylinders 14, 16. Accordingly, if the two-position valve 28 is switched to the pressure-increase position in this condition, the pressure in the wheel cylinder 16 is increased at the predetermined rate.

Figure 2:
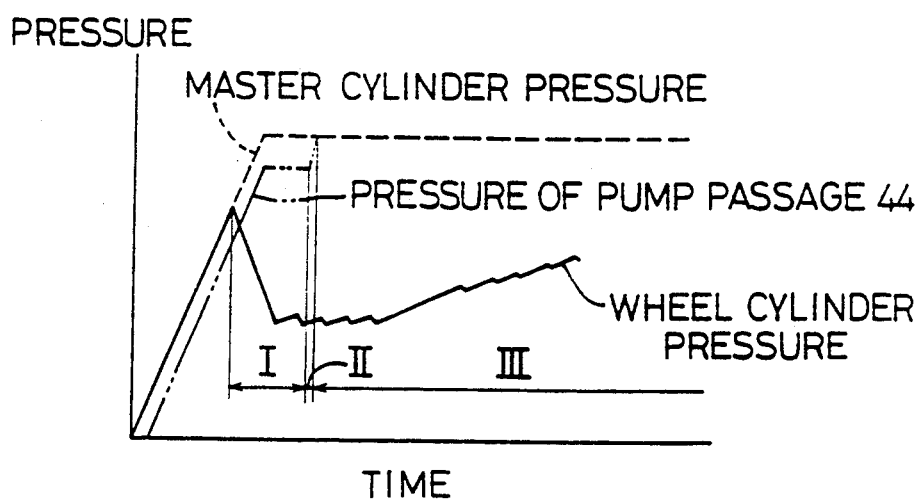
FIG. 2 is a graph showing variation in the pressures in the master cylinder, wheel cylinder and pump passage of the brake system of FIG. 1.

It will be understood from the foregoing description of the present embodiment that in the first operation cycle of the two-position valve 28 in the pressure-hold mode, the rate or gradient of increase in the pressure of the wheel cylinder 16 is made constant for all pressure increasing intervals of the cycle, even if the pressure increasing operation is commenced before the pump 40 starts to substantially function. Accordingly, the pressure in the wheel cylinder 16 can be held at a constant level as required, during the pressure-hold mode of operation of the valve 28, as indicated in FIG. 2 by way of example.

Figure 3:
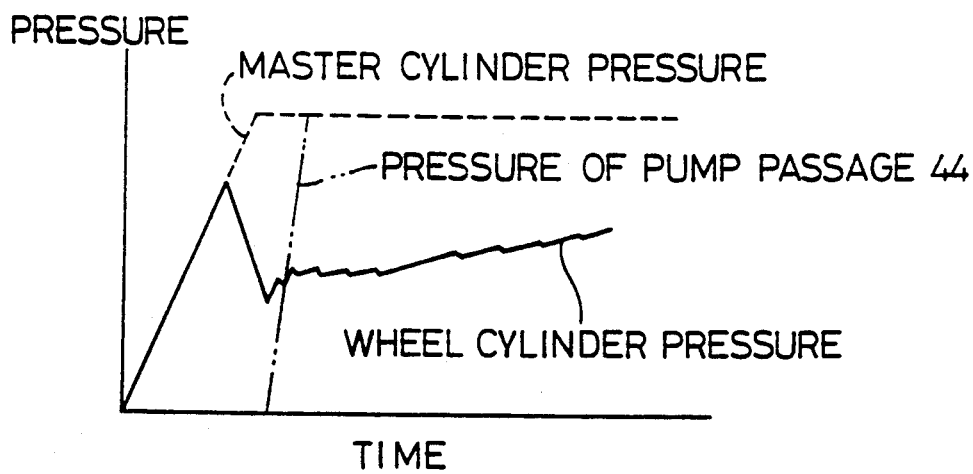
FIG. 3 is a graph corresponding to that of FIG. 2, showing the pressure variation in a conventional anti-lock brake system.

If the present brake system were not provided with the pilot passage 76 and the check valve 80, the equilibrium position of the control piston 48 would be offset from the practically desired position (predetermined nominal position) in the reverse direction on the side of the second pilot chamber 56, before the pressure in the second pilot chamber 56 is raised to a sufficiently high level, that is, during an initial period immediately after the activation of the pump 40, which period corresponds to a time lag before the pump 40 starts to practically function. As a result, the fluid would be fed to the wheel cylinder 16 at an excessively high rate, as indicated in the graph of FIG. 3 by way of example. In other words, the pressure in the wheel cylinder 16 would be increased at an inadequate point of time, at which the wheel cylinder pressure should not be increased for optimum braking. In this event, the locking tendency of the wheel would be deteriorated particularly where the wheel is running on a road surface having a low friction coefficient, which requires a relatively long time to reduce the slip ratio of the wheel below the upper limit. Therefore, the absence of the pilot passage 76 and the check valve 80 causes the brake system to fail to provide a sufficient effect of reducing the slip ratio of the wheel by adequately regulating the wheel cylinder pressure in the anti-lock control mode.

The electric control device 34 is adapted to command the two-position valve 28 to operate in a slow-pressure-increase mode after the valve 28 is operated in the pressure-hold mode for a predetermined time period. In the slow-pressure-increase mode, the pressure-increase and pressure-decrease positions are alternately established at predetermined time intervals, so that the rate of increase in the wheel cylinder pressure in the slow-pressure-increase mode is lower than that in the pressure-increase mode in which the valve 28 is kept in the pressure-increase position. Usually, the delivery pressure of the pump 40 has been raised to the pressure in the master cylinder 14 by the time the first operation cycle in the slow-pressure-increase mode is started. Therefore, the flow restricting valve 26 regulates the area of fluid flow therethrough based on the pressure difference between the master and wheel cylinders 14, 16, from the very beginning of the first operation cycle in the slow-pressure-increase mode. In this mode, therefore, the fluid is supplied to the wheel cylinder 16 at a substantially constant rate, irrespective of the pressures in the master and wheel cylinders 14, 16.

If the excessively locking tendency of the left front wheel takes place again during the slow-pressure-increase mode of operation, the electric control device 34 commands the two-position valve 28 to be placed in the pressure-decrease mode again. As the slip ratio of the wheel subsequently varies, the two-position valve 28 is selectively placed in appropriate one of the pressure-hold mode, slow-pressure-increase mode and pressure-decrease mode, so that the slip ratio of the wheel is maintained within the predetermined optimum range.

When the operating force is removed from the brake pedal 10 while the brake system is in the anti-lock control mode, the electric control device 34 commands the two-position valve 28 to be placed in the pressure-increase mode in which the pressure-increase position is maintained. In this mode, the fluid discharged from the wheel cylinder 16 is returned to the master cylinder 14, through two paths, one path consisting of the fluid passage 22, two-position valve 28, fluid passage 20, flow restricting valve 26 and fluid passage 18, and the other path consisting of the pilot passages 76, 74 and pump passage 44. At this time, the pressure in the first pilot chamber 54 of the valve 26 becomes slightly higher than the pressure in the second pilot chamber 56, whereby the fluid from the wheel cylinder 16 is fed into the first pilot chamber 54 while the fluid is discharged from the second pilot chamber 56 and fed toward the master cylinder 14 through the pilot passage 74, pump passage 44 and check valve 45. As a result, the control piston 48 is returned to its non-operated or fully retracted position. For a suitable time after the operating force is removed from the brake pedal 10, the pump 40 is kept operated to return the fluid from the reservoir 32 to the master cylinder 14.

It will be understood from the above description that the present brake system has a flow control device constituted by the flow restricting valve 26, pilot passages 72, 74 and check valve 45, and assisting means which is constituted by the pilot passage 76 and check valve 80, to assist the flow control device so that the flow control device is operated in the predetermined manner. However, the flow control device may be considered to be constituted by the flow restricting valve 26, pilot passages 72, 76, a portion of the pilot passage 74 between the second pilot chamber 56 and the point of connection to the pilot passage 76, and the check valve 45. In this case, the assisting means is considered to be constituted by the check valve 80 and a portion of the pilot passage 74 between the pump 40 and the point of connection to the pilot passage 76.

Although the opening pressure difference of the check valve 80 is set to be equal to the pressure difference $\Delta P$ which is estimated to exist between the pressures in the fluid passages 20, 22 when the brake pedal 10 is operated at the presumed highest speed, the opening pressure difference of the valve 80 may be more or less higher or lower than the pressure difference $\Delta P$.

Figure 4:
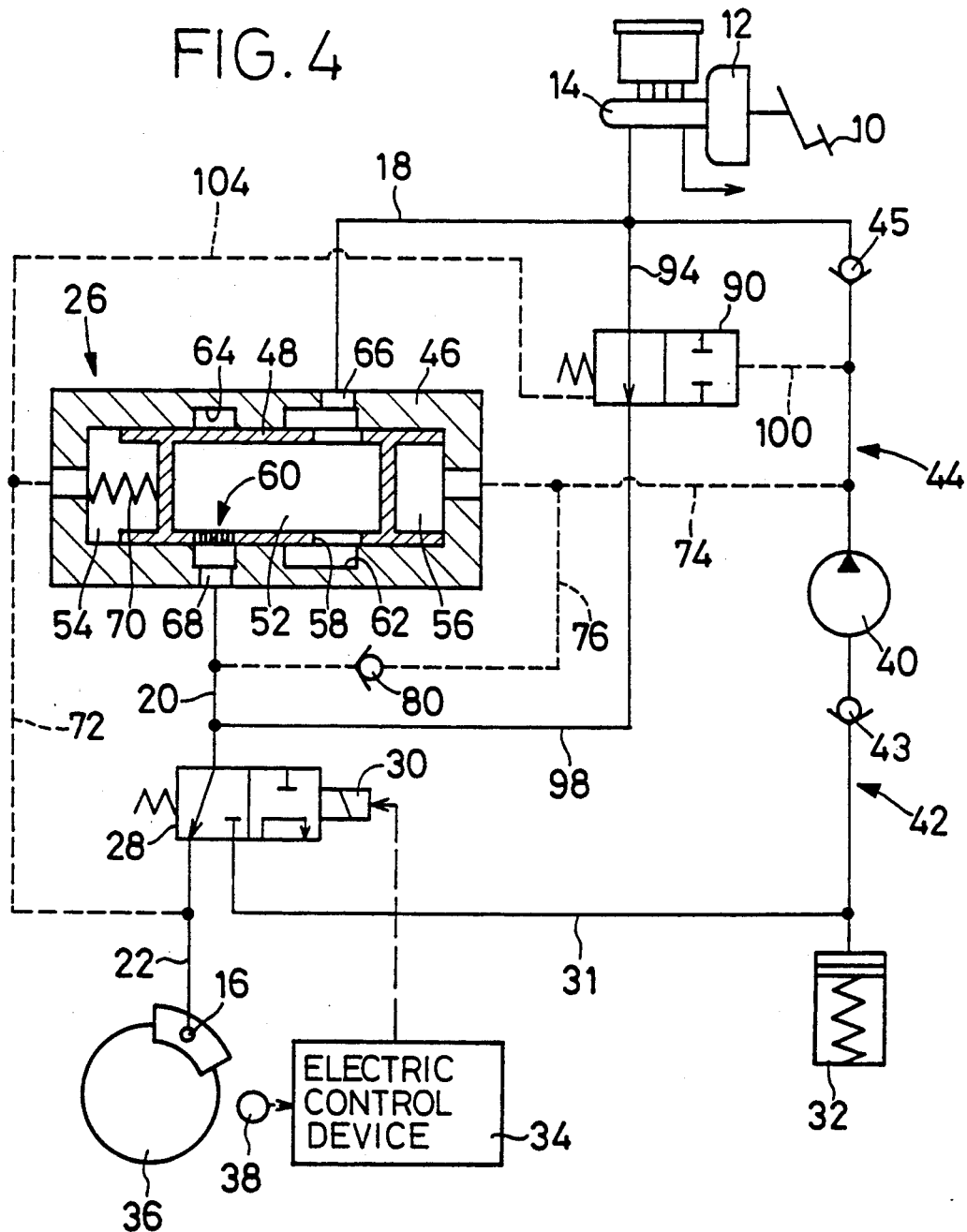
FIGS. 4, 5, 6, 7, 8 and 9 are schematic views corresponding to that of FIG. 1, showing other embodiments of the invention.

Referring to FIG. 4, there is shown another embodiment of the present invention. The same reference numerals as used in the first embodiment will be used in this second embodiment, to identify the functionally corresponding components, which will not be described redundantly.

In the embodiment of FIG. 4, a pilot-operated shut-off valve 90 is provided in parallel relationship with the variable flow restricting valve 26. The shut-off valve 90 is connected to the fluid passage 18 through a fluid passage 94, and to the fluid passage 20 through a fluid passage 98. This shut-off valve 90 has an open position for fluid communication between the passages 94 and 98, and a closed position for disconnecting these passages 94, 98.

The pilot-operated shut-off valve 90 has two pilot chambers, one of which is connected through a pilot passage 100 to a part of the pump passage 44 between the check valve 45 and the pump 40. The other pilot chamber is connected through a pilot passage 104 to the pilot passage 72 which is connected to the first pilot chamber 54 of the flow restricting valve 26. The shut-off valve 90 is normally held in its open position under a biasing force (almost negligibly small) of suitable biasing means. When the pressure in the pilot passage 100 exceeds the pressure in the pilot passage 104, the shut-off valve 90 is brought into its closed position.

While the brake pedal 10 is in the non-operated position, no pressure is produced by the master cylinder 14, and the pump 40 is held off, whereby pilot pressures are applied to neither the first and second pilot chambers 54, 56 of the flow restricting valve 26, or the pilot chambers of the shut-off valve 90. Therefore, the control piston 48 is held in its fully retracted position of FIG. 4 for maximum area of fluid flow through the valve 26, while the shut-off valve 90 is held in its open position.

Upon depression of the brake pedal 10 in this condition, the pressure in the fluid passage 20 is applied to the second pilot chamber 56 of the restricting valve 26 and to the pilot chamber of the shut-off valve 90 which is connected to the pilot passage 100, such that the pilot pressures applied to the valves 26 and 90 are lower than the pressure in the passage 20, by the opening pressure difference of the check valve 80, as described above with respect to the first embodiment. At the same time, the pressure in the fluid passage 22 is applied to the first pilot chamber 54 of the valve 26 and to the pilot chamber of the shut-off valve 90 which is connected to the pilot passage 104, with substantially no pressure reduction. This arrangement permits the control piston 48 of the valve 26 and the shut-off valve 90 to be held in the fully retracted or non-operated position and the open position, respectively, even if the pressure in the passage 20 becomes higher than the pressure in the passage 20 upon abrupt operation of the brake pedal 10. Consequently, the pressurized fluid delivered from the master cylinder 14 is fed to the fluid passage 20, through two paths one of which includes the passage 18 and restricting valve 26, and the other of which includes the passage 94, shut-off valve 90 and passage 98. Therefore, the fluid is supplied to the wheel cylinder 16 at a relatively high rate of flow, whereby delayed brake application can be avoided.

When the electric control device 34 commands the two-position valve 28 to initiate the anti-lock pressure control operation, starting with the pressure-decrease mode of operation, the pressure in the wheel cylinder 16 is rapidly lowered. At this time, the pressure in the fluid passage 22 is lowered at a high rate while the pressure in the fluid passage 20 is maintained substantially constant. When the pressure in the passage 20 minus the opening pressure difference of the check valve 80 becomes higher than the pressure in the passage 22 minus the pressure corresponding to the biasing means of the shut-off valve 90, the shut-off valve 90 is brought to its closed position, and the passage 94 is disconnected from the passage 98. In the first pressure-decrease mode of operation following the initiation of the anti-lock pressure control operation, the pressure in the wheel cylinder 16 is generally lowered to a level which is lower than the pressure in the master cylinder 14 minus the opening pressure difference of the check valve 80. As a consequence, the shut-off valve 90 can be switched to the closed position, without fail, before the first pressure-hold mode of operation is started, even if the practical functioning of the pump 40 is more or less delayed with respect to the commencement of the anti-lock pressure control operation. That is, the present arrangement is free from the problem which would otherwise occur due to the delayed practical functioning of the pump 40 and resulting failure to close the shut-off valve 90 at the appropriate time. In other words, the present arrangement can prevent the wheel cylinder 16 from receiving the fluid from both the restricting valve 26 and the shut-off valve 90 in the first pressure-hold mode of operation, thereby avoiding an increase in the pressure in the wheel cylinder 16 in the pressure-hold mode.

After the pump 40 has started to substantially function, namely, after the delivery pressure of the pump 40 has reached the level of the pressure in the master cylinder 14, the area of fluid flow through the restricting valve 26 is controlled based on the difference between the delivery pressure of the pump 40 and the pressure in the passage 22, i.e., based on the pressure difference between the master cylinder 14 and the wheel cylinder 16. At the same time, the shut-off valve 90 is maintained in the closed position.

In the present embodiment, the control piston 48 of the flow restricting valve 26 has no small apertures 61 as provided in the first embodiment. As the control piston 48 is advanced from the non-operated position, the small through-holes 60 are disconnected one by one from the annular groove 64. While the maximum rate of fluid flow through the valve 26 in the present embodiment is lower than that in the preceding embodiment, in the absence of the small apertures 61, the present embodiment will not suffer from delayed brake application, since the shut-off valve 90 is normally held in the open position allowing the fluid to be fed to the wheel cylinder 16 at a sufficiently high rate.

It is noted that it is relatively easy to design and construct the shut-off valve 90 such that the valve 90 can be surely switched from the open position to the closed position when the pressure in the pilot passage 100 becomes slightly higher than the pressure in the pilot passage 104. On the other hand, it is relatively difficult to design and construct the flow restricting valve 26 of FIG. 1 such that the control piston 48 can be surely moved from the fully retracted position in the forward direction by a suitable distance so that the all the small apertures 61 are offset and disconnected from the annular groove 64, when the pressure in the second pilot chamber 56 becomes higher than the pressure in the first pilot chamber 54 by a predetermined amount. In other words, it is easy to determine the biasing force of the biasing means biasing the valve member of the shut-off valve 90 such that the valve member is held in the open position by the biasing means while the pressures in the master cylinder 14 and the wheel cylinder 16 are substantially equal to each other, and is moved to the closed position against the biasing force of the biasing means when the pressure in the wheel cylinder 16 is lower than that in the master cylinder 14. On the other hand, the spring 70 biasing the control piston 48 should be designed so that the control piston 48 is held in the fully retracted position while the pressures in the master and wheel cylinders 14, 16 are substantially equal to each other, and so that the advancing distance of the control piston 48 from the fully retracted position corresponds to the pressure difference between the master and wheel cylinders 14, 16. It will be understood from the above that the flow restricting valve 26 may be relatively easily designed and constructed. Further, the rate of flow of the fluid through the restricting valve 26 can be restricted so as to avoid an excessively high rate of increase in the pressure of the wheel cylinder 16, even if the control piston 48 cannot be advanced by a required distance corresponding to the pressure difference between the master and wheel cylinders 14, 16, for some reason or other. Thus, the present brake system has improved operating reliability.

When the operating force is released from the brake pedal 10, the electric control device 34 commands the two-position valve 28 to be placed in the pressure-increase mode, and the control piston 48 and the shut-off valve 90 are returned to the fully retracted position and the open position, respectively.

It will be understood from the description of the present embodiment that the flow control device is constituted by the flow restricting valve 26, pilot passages 72, 74, shut-off valve 90, pilot passage 100 and check valve 45, while the assisting means for assisting the flow control device is constituted by the pilot passages 76, 104 and check valve 80. However, the flow control device may be considered to consist of the flow restricting valve 26, pilot passages 72, 76, 100, 104, check valve 45, and a portion of the pilot passage 74 between the second pilot chamber 56 and the point of connection to the pilot passage 76. In this case, the assisting means may be considered to consist of the check valve 80, and a portion of the pilot passage 74 between the points of connection to the passage 76 and pump passage 44.

Figure 5:
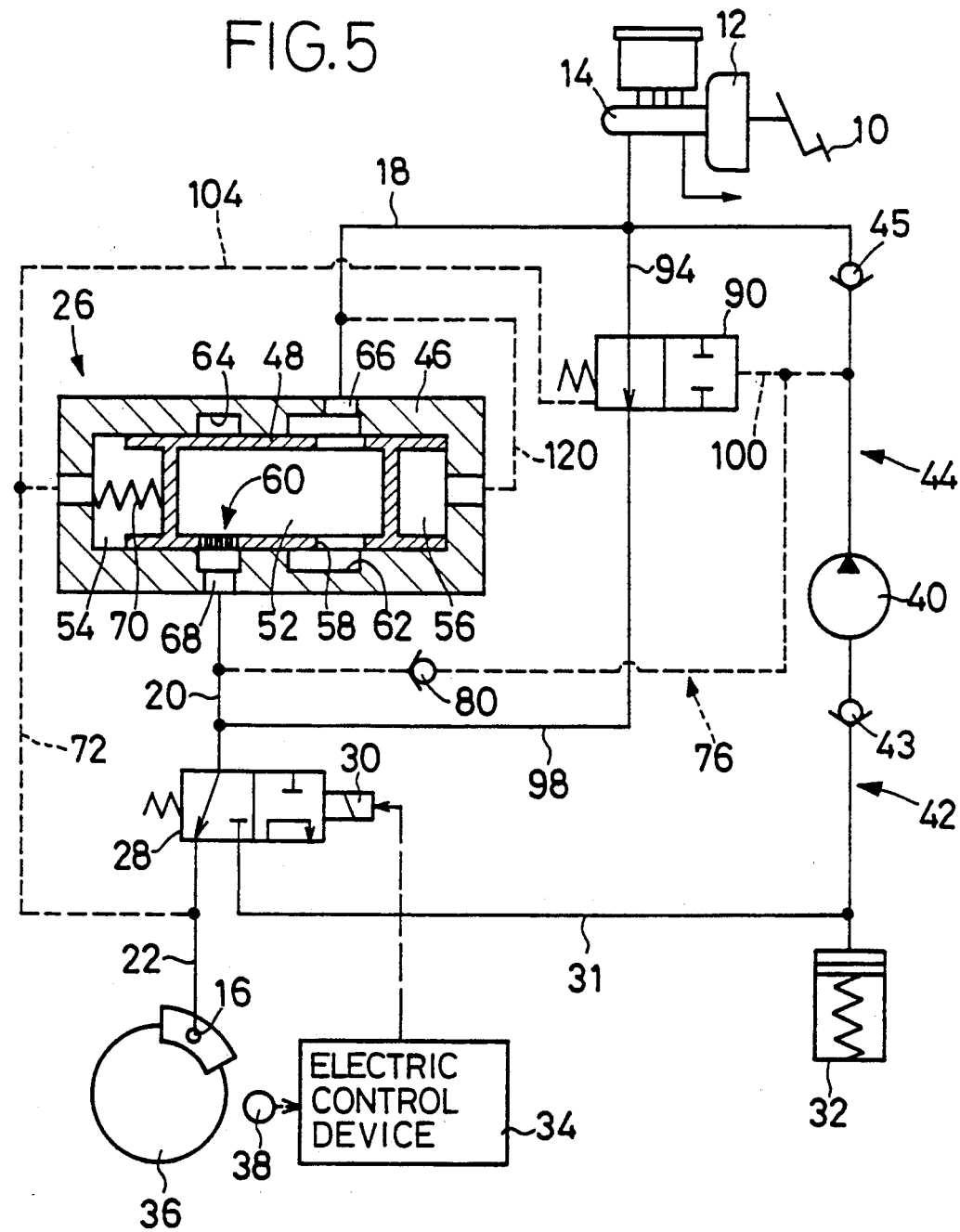

Referring next to FIG. 5, there is shown a further embodiment of the present invention. The same reference numerals as used in the second embodiment of FIG. 4 will be used in this third embodiment to identify the functionally corresponding components, which will not be described to avoid redundancy.

Like the preceding embodiment, the present embodiment has the shut-off valve 90 disposed in parallel to the flow restricting valve 26. However, the pilot passage 74 is replaced by a pilot passage 120 which connects the second pilot chamber 56 of the valve 26 and the fluid passage 18. Further, the pilot passage 76 incorporating the check valve 80 is connected to the pilot passage 100.

In the present embodiment, the control piston 48 of the restricting valve 26 is advanced to reduce the rate of fluid flow through the valve 26 toward the wheel cylinder 16, when there arises a pressure difference between the fluid passages 18 and 22 upon abrupt depression of the brake pedal 10. However, the shut-off valve 90 is placed in the open position, permitting a high rate of flow of the fluid to rapidly increase the pressure in the wheel cylinder 16. Thus, delayed brake application to the wheel can be avoided. In this embodiment, the shut-off valve 90 is designed so that the pressure in the wheel cylinder 16 can be increased at a sufficiently high rate even if the fluid supply to the wheel cylinder is effected through only the shut-off valve 90 held in the open position, i.e., even if the fluid supply were not effected through the restricting valve 26.

Further, since the pressure in the fluid passage 18 is applied to the second pilot chamber 56 of the valve 26 through the pilot passage 120, the valve 26 is always placed in a condition in which the area or rate of fluid flow toward the two-position valve 28 is controlled based on the pressure difference between the master and wheel cylinders 14, 16. This eliminates an excessive amount of supply of the fluid to the wheel cylinder 16 even before the practical functioning of the pump 40 is initiated following the commencement of the first pressure-hold mode of operation during the anti-lock pressure control operation of the two-position valve 28.

It will be understood from the above description that the flow control device of the present embodiment is constituted by the restricting valve 26, pilot passages 72, 100, 120, shut-off valve 90 and check valve 45, while the assisting means is constituted by the pilot passages 76, 104 and check valve 80. However, the flow control device may be considered to be constituted by the restricting valve 26, pilot passages 72, 76, 104, 120, a portion of the pilot passage 100 between the shut-off valve 90 and the point of connection to the pilot passage 76, and check valve 45. In this case, the assisting means may be considered to consist of the check valve 80, and a portion of the pilot passage 100 between the points of connection to the pilot and pump passages 76, 44.

Figure 6:
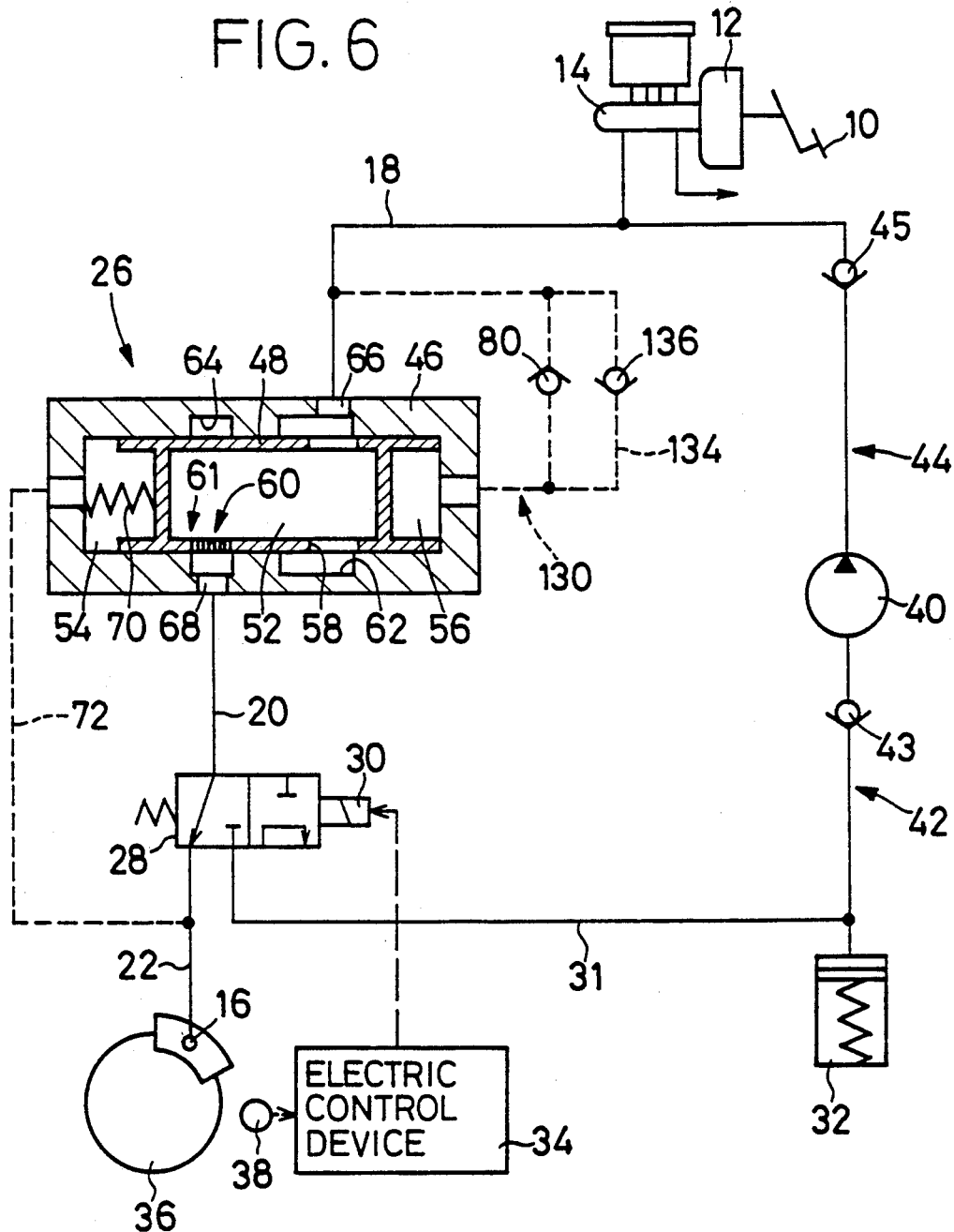

A still further embodiment of the invention is illustrated in FIG. 6, in which the same reference numerals as used in the first embodiment are used to identify the functionally corresponding components, a redundant description of which will not be provided.

In this embodiment, the second pilot chamber 56 of the restricting valve 26 is connected to the fluid passage 18 through a pilot passage 130 which incorporates the check valve 80. In this embodiment, however, the check valve 80 allows the fluid flow in the direction from the fluid passage 18 toward the second pilot chamber 56, and inhibits the flow in the opposite direction.

When the brake pedal 10 is abruptly depressed, the pressure in the fluid passage 18 is higher than that in the fluid passage 22, by an amount equal to the sum of a pressure difference or drop ΔP1 due to a resistance to the flow through the restricting valve 26 and a pressure difference or drop ΔP2 due to a resistance to the flow through the two-position valve 28. Accordingly, the pressure difference required to open the check valve 80 is determined to be equal to the sum of the pressure differences ΔP1 and ΔP2 which arise when the brake pedal 10 is operated at the highest speed.

A return passage 134 is connected in parallel to the pilot passage 130. This return passage 134 has a check valve 136 which allows the fluid to flow in the direction from the second pilot chamber 56 toward the passage 18, but inhibits the flow in the opposite direction. The opening pressure difference of this check valve 136 is negligibly small.

In the present embodiment, the pressure in the passage 18 is imparted to the second pilot chamber 56, with a pressure drop corresponding to the opening pressure difference of the check valve 80. Therefore, during a normal braking with the brake pedal 10 relatively abruptly depressed, the control piston 48 is held in the non-operated or fully retracted position, even though the pressure in the passage 18 is higher than the pressure in the passage 22. Consequently, the fluid is fed at a sufficiently high rate to the wheel cylinder 16, whereby delayed braking to the wheel is avoided.

In the pressure-decrease mode, the pressure difference between the wheel and master cylinders 16, 14 is larger than the opening pressure difference of the check valve 80, whereby the delayed practical function of the pump 40 will not cause an excessively high rate of flow of the fluid into the wheel cylinder 16. When the operating force is removed from the brake pedal 10, the fluid is discharged from the second pilot chamber 56 and is returned to the master cylinder 14 through the return passage 134, and the control piston 48 is returned to its fully retracted position.

It will be understood from the above description that the flow control device in the present embodiment consists of the restricting valve 26, pilot chambers 72, 130, 134 and check valve 136, while the assisting means consists of the check valve 80.

While the pilot-operated restricting valve 26 of the flow control device provided in the foregoing embodiments is disposed between the master cylinder 14 and the solenoid-operated two-position valve 28, the valve 26 may be disposed between the two-position valve 28 and the wheel cylinder 16.

In the second and third embodiments of FIGS. 4 and 5, the shut-off valve 90 is provided in the by-pass passage (fluid passages 94 and 98) which connects the passages 18 and 20. However, the shut-off valve 90 may be disposed in a by-pass passage which connects the passages 18 and 22.

Figure 7:
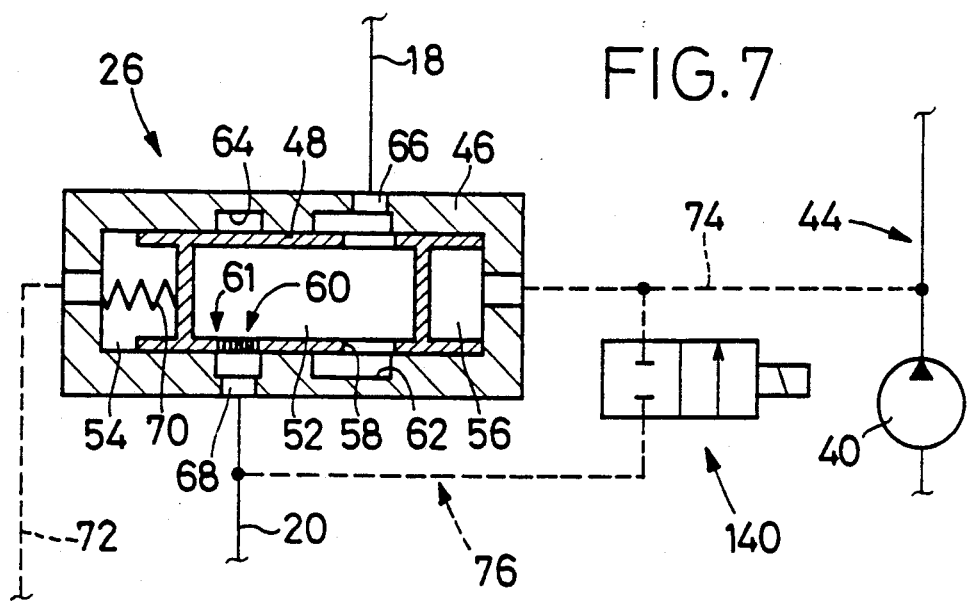

Although the check valve 80 and the shut-off valve 90 provided in the above embodiments are hydraulically operated, these valves may be replaced by respective electrically controlled valves. For instance, a solenoid-operated shut-off valve 140 may be substituted for the check valve 80, as illustrated in FIG. 7. This shut-off valve 140 is controlled to be placed in the closed position during a period while there exists a pressure difference between the passages 20, 22 during a normal braking operation, and during a period while the two-position valve 28 is placed in the pressure-increase position during an anti-lock pressure control operation. In the other cases, the shut-off valve 140 is placed in the open position. In the second embodiment, the shut-off valve 90 may be replaced by a solenoid-operated shut-off valve which is controlled to be closed for at least a period while the two-position valve 28 is placed in the pressure-increase position during an anti-lock pressure control operation.

Figure 8:
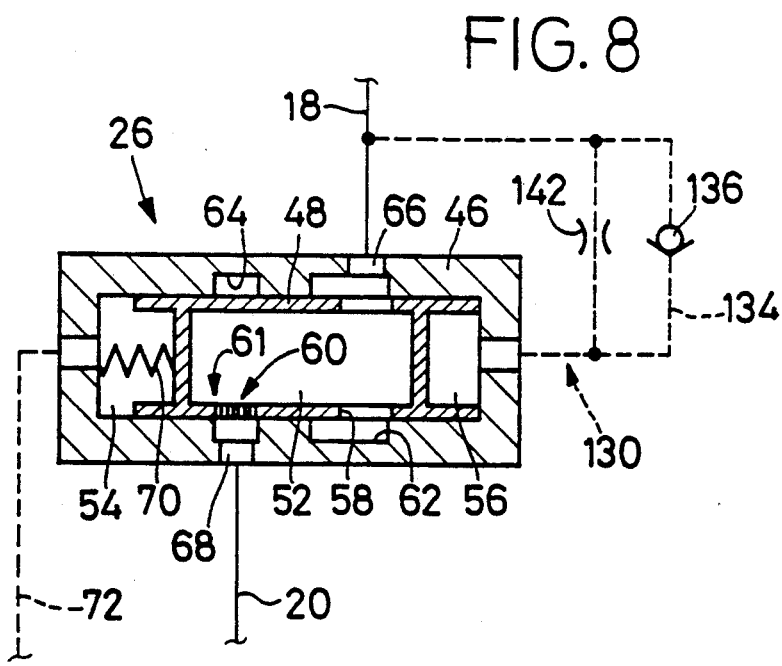

In the embodiments described above, the check valve 80 is used as pressure reducing means to effect reduction of the pressure applied to the second pilot chamber 56 as compared with the pressure in the passage 20, 18 connected to the master cylinder 14. However, the check valve 80 may be replaced by a flow restrictor means which disposed between the master cylinder 14 and the restricting valve 26 or shut-off valve 90, so as to restrict the flows of the fluid in the opposite directions to and from the master cylinder 14. In this case, the resistance to the fluid flows through the restrictor means effect the required pressure reduction as provided by the check valve 80. FIG. 8 shows an example of such flow restrictor means in the form of a flow restrictor 142, which is substituted for the check valve 80 used in the fourth embodiment of FIG. 6.

Figure 9:
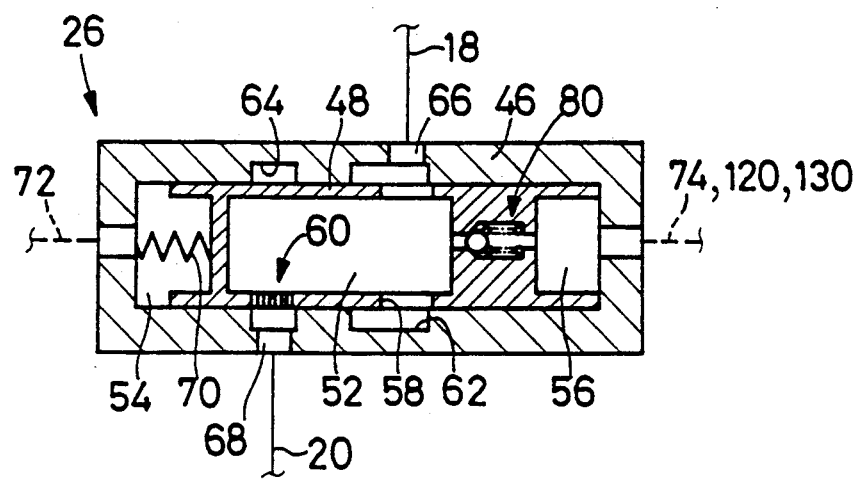

In the above embodiments of FIGS. 1 and 4-6, the check valve 80 is disposed in the pilot passage 76, 120, 130 connecting the second pilot chamber 56 of the restricting valve 26 and the passage leading to the master cylinder 14. However, the check valve 80 may be provided in a communication hole formed through a wall of the control piston 48 of the restricting valve 26 such that the hole communicates with the second pilot chamber 56 and the fluid chamber 52 which communicates with the passage 18, as shown in FIG. 9. In this case, the check valve 80 allows the fluid flow in the direction from the fluid chamber 52 toward the second pilot chamber 56, but inhibits the fluid flow in the opposite direction. In the embodiment of FIG. 5, the check valve 80 is disposed in the pilot passage 76 connected to the passage 20, this valve 80 may be provided in a pilot passage which connects the passages 18 and 100.

Figure 10:
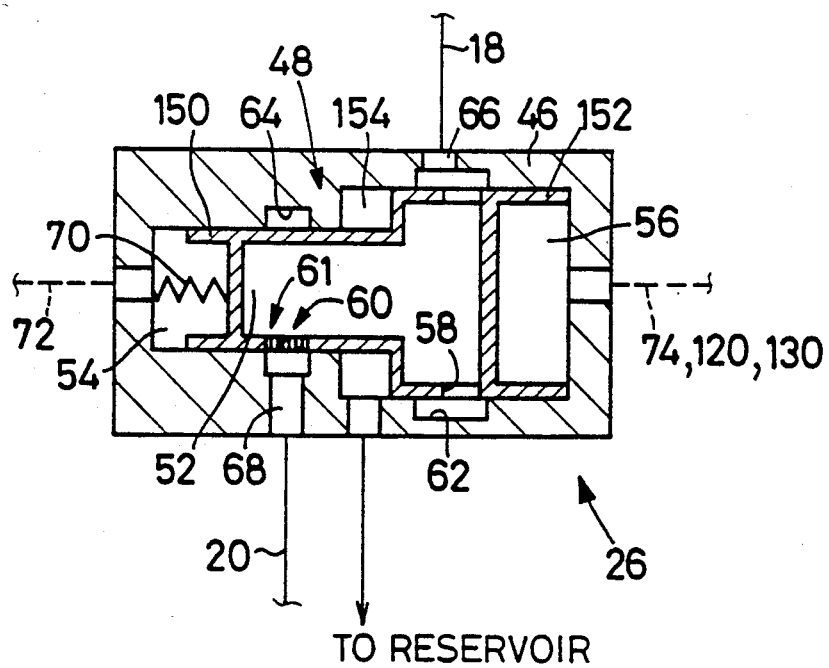
FIG. 10 is a front elevational view in cross section of a variable flow control device different from that used in the embodiments of FIGS. 1 and 4-9.

It is known that the rate of increase in the pressure of the wheel cylinder 16 changes depending upon the level of the wheel cylinder pressure, as well as upon the pressure difference between the master and wheel cylinders 14, 16. For improved accuracy of controlling the pressure in the wheel cylinder 16, it is desirable to control the rate of fluid flow into the wheel cylinder 16 depending also upon the present level of the wheel cylinder pressure. In this case, the flow restricting valve 26 may be constructed as illustrated in FIG. 10, by way of example only. In this valve 26, the control piston 48 consists of a stepped valve member which has a small-diameter portion 150 partially defining the first pilot chamber 54, and a large-diameter portion 152 partially defining the second pilot chamber 56. This stepped valve member is fluid-tightly and slidably received in a stepped bore formed in the housing 46, such that an atmospheric pressure chamber 154 is defined between the shoulder surfaces of the valve member 48 and the housing bore. This atmospheric pressure chamber 154 is held in communication with the reservoir 32.

In the thus constructed flow restricting valve 26, the control piston 48 receives two advancing forces, which act on the piston in the forward or advancing direction. The first advancing force is represented by a product obtained by multiplying the pressure difference between the master and wheel cylinders 14, 16, by the pressure-receiving area of the large-diameter portion 152. The second advancing force is represented by a product obtained by multiplying the pressure in the wheel cylinder 16, by a difference obtained by subtracting the pressure-receiving area of the small-diameter portion 150 from that of the large-diameter portion 152. Thus, it is apparent that the advancing distance of the control piston 48 increases with the pressure of the wheel cylinder 16, as well as with the pressure difference between the master and wheel cylinders 14, 16. Therefore, the rate of flow of the fluid into the wheel cylinder and the rate of increase in the wheel cylinder pressure decrease not only with an increase in the above-indicated pressure difference, but also with an increase in the wheel cylinder pressure. This arrangement permits a substantially constant gradient of increase in the wheel cylinder pressure, irrespective of the above-indicated pressure difference and the wheel cylinder pressure.

Figure 11:
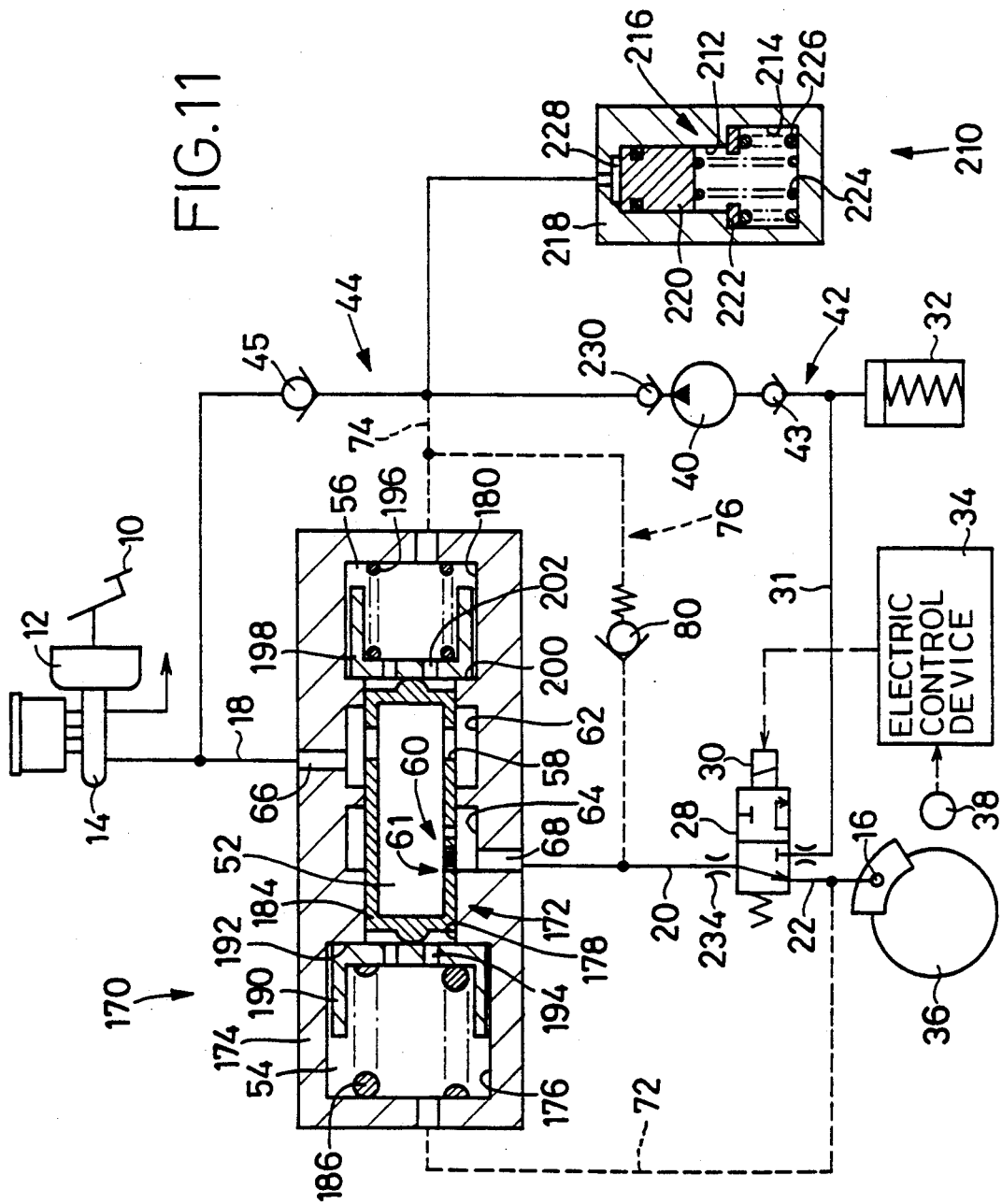
FIG. 11 is a schematic view illustrating another embodiment of the invention.

Referring next to FIG. 11, there is illustrated a still further embodiment of this invention, which is identical with the first embodiment of FIG. 1, in many aspects. The same reference numerals as used in FIG. 1 are used to identify the functionally corresponding components, and no redundant description of these components will be given.

In the brake system of FIG. 11, a pilot-operated variable flow restricting valve 170 is provided as a major part of the flow control device, between the fluid passages 18 and 20. The flow restricting valve 170 has a housing 174 having a stepped bore 172 formed therein. The stepped bore 172 consists of a round hole 176, a cylinder bore 178 and a round hole 180 which are coaxially formed in the order of description, from left to right as seen FIG. 11. The round holes 176, 180 have larger diameters than the diameter of the cylinder bore 178.

The cylinder bore 178 substantially fluid-tightly accommodates a cylindrical control piston 184 slidably in the axial direction. The control piston 184 is closed at its opposite ends, and cooperates with the housing 174 to define the first pilot chamber 54, fluid chamber 52 and second pilot chamber 56, which are arranged in this order from left to right as seen in FIG. 11. The control piston 184 has a circumferential wall which has the large through-holes 58, small through-holes 60 and small apertures 61, similar to those formed in the control piston 48 of FIG. 1. The housing 174 has the annular grooves 62, 64 formed in its inner surface, such that these grooves 62, 64 communicate the respective ports 66, 68.

A spring 186 is disposed in the round hole 176, in coaxial relation with each other, and a spring retainer 190 is disposed between the spring 186 and the control piston 184 such that the spring retainer 190 is slidable in the axial direction in the round hole 176. The retainer 190 takes the form of a cup having a diameter larger than the inside diameter of the cylinder bore 178.

The spring retainer 190 is biased in the rearward direction (to the right as viewed in FIG. 11) under a biasing action of the spring 186. The fully retracted position by the retainer 190 is determined by a shoulder surface 192 between the round hole 176 and the cylinder bore 178. With the retainer 190 placed in its fully retracted position, the biasing force of the spring 186 is prevented from acting on the control piston 184. When the control piston 184 is advanced from the non-operated or original position of FIG. 11 in the forward direction (to the left), the retainer 190 is advanced from the fully retracted position. In this condition, the retainer 190 allows the biasing force of the spring 186 to act on the control piston 184.

The bottom wall of the retainer 190 divides the first pilot chamber 54 into two sections, and has a plurality of communication holes 194 which communicate with the two sections. The spring 186, which is functionally equivalent to the spring 70 provided for the restricting valve 26 of the preceding embodiments, functions to control the axial position of the control piston 184 according to the pressure difference between the first and second pilot chambers 54, 56.

A spring 196 is disposed in the round hole 180 in coaxial relation with each other. Between this spring 196 and the control piston 184, there is axially slidably disposed a cup-shaped spring retainer 198 having a larger diameter than the inside diameter of the cylinder bore 178. The retainer 198 is biased in the forward direction by the spring 196, and the fully advanced position of the retainer retainer 198 is established by abutting contact of the 198 with a shoulder surface 200 between the cylinder bore 178 and the round hole 180. The spring 196 has a comparatively small biasing force, by which the retainer 198 pushes the control piston 184 and thereby cooperates with the retainer 190 to hold the control piston 184 in the non-operated position, while there exists no pressure difference between the first and second pilot chambers 54, 56, i.e., while no force acts on the control piston 184 in the rearward direction toward the retainer 198. When the pressure in the first pilot chamber 54 slightly exceeds the pressure in the second pilot chamber 56, thereby producing a force which acts on the control piston 184 in the rearward direction, the retainer 198 allows the control piston 184 to move therewith in the rearward direction from the non-operated position. The bottom of the retainer 198 also has a plurality of communication holes 202. The rearmost position of the control piston 184 is established by abutting contact of the rear end face of the retainer 198 with the axial end surface of the round hole 180 remote from the bottom wall of the retainer 198. Each of the opposite end faces of the control piston 184 has a part-spherical protuberance formed in the center, so that the control piston 184 abuts on the retainers 190, 198 at these protuberances.

The opening pressure difference of the check valve 80, i.e., the pressure difference on the opposite sides of the check valve 80, at which the valve 80 is opened, is set to be higher than the pressure difference $\Delta P$ by which the pressure in the port 68 of the restricting valve 26 is higher than the pressure in the wheel cylinder 16 when the brake pedal 10 is operated at the highest speed. Accordingly, the pressure in the first pilot chamber 54 necessarily exceeds the pressure in the second pilot chamber 56 during a normal braking operation.

Between a portion of the pump passage 44 between the check valve 45 and the pump 40, there is connected a pulsation absorber 210 for reducing pressure pulsation of the fluid delivered by the pump 40.

The pulsation absorber 210 has a housing 218 which has a stepped bore 216 consisting of a small cylinder bore 212 and a large bore 214 which communicate with each other. A piston 220 is fluid-tightly and axially slidably received in the cylinder bore 212, while an annular movable member 222 is axially slidably received in the large bore 214. The housing 218 also receives a coil spring 224 and a coil spring 226. The spring 224 extends through a central opening of the annular movable member 222 and has a comparatively small biasing force. The spring 226 extends surrounding the coil of the spring 224 in coaxial relation therewith and has a comparatively large biasing force. The springs 224, 226 bias the piston 220 and the movable member 222 to hold them in the original or fully advanced positions of FIG. 11. The piston 220 cooperates with the housing 218 to define a fluid chamber 228 in a portion of the cylinder bore 212 remote from the large bore 214.

A check valve 230 is provided in a portion of the pump passage 44 between the pump 40 and the pulsation absorber 210. The check valve 230 inhibits a flow of the fluid from the pulsation absorber 210 into the pump 40. The opening pressure difference of this check valve 230 is negligibly small.

In the brake system constructed as described above, the control piston 184 of the flow restricting valve 170 is normally held in the non-operated or original position of FIG. 11 for maximum rate of fluid flow, without pilot pressures applied to the first and second pilot chambers 54, 56, with the master cylinder 14 and the pump 40 being held at rest.

Upon depression of the brake pedal 10 in this condition, the pressure in the master cylinder 14 is usually raised from the zero level and eventually maintained at a given level, as indicated in the graph of FIG. 12.

While the operating force acting on the brake pedal 10 is increasing, the increasing pressure in the wheel cylinder 16 is lower than the increasing pressure in the master cylinder 14, due to resistances to the flows of the fluid through the restricting valve 170, a flow restrictor 234 provided in the passage 20 and the two-position valve 28. Further, the increasing pressure in the second pilot chamber 56 is lower than the pressure in the master cylinder 14, due to resistances to the flows of the fluid through the valve 170 and the check valve 80. As indicated above, the opening pressure difference of the check valve 80 is set so that the pressure in the first pilot chamber 54 is higher than that in the second pilot chamber 56, even where there arises a maximum pressure drop on the downstream side of the restricting valve 170 and the two-position valve 28, upon operation of the brake pedal 10 at the highest speed. Consequently, the increasing the operating force of the brake pedal 10 will cause a force which acts on the control piston 184 in the rearward direction.

When the rearward force acting on the control piston 184 exceeds the sum of the biasing force of the spring 196 and the biasing force of the spring 224, the control piston 184 is moved with the retainer 198 to the rearmost position, while forcing out the fluid in the second pilot chamber 56, into the pulsation absorber 210. While the control piston 184 is positioned between the non-operated position and the rearward position, all of the large through-holes 58, small through-holes 60 and small apertures 61 are held in communication with the annular grooves 62, 64. Therefore, the fluid can be fed to the wheel cylinder 16 at a sufficiently high rate of flow, even if the control piston 184 is moved in the rearward direction during normal brake application.

When the operating force on the brake pedal 10 reaches a given constant level, the pressure in the master cylinder 14 reaches a given constant level, and there exist no flow resistances in the restricting valve 170, flow restrictor 234 and two-position valve 28. As a result, the pressure in the master cylinder 16, the pressure in the port 68 of the valve 170 and the pressure in the first pilot chamber 54 are made equal to each other, whereby the pressure in the first pilot chamber 54 becomes higher than that in the second pilot chamber 56, by an amount equal to the opening pressure difference of the check valve 80.

When the operating force is removed from the brake pedal 10 and the master cylinder 14 is de-activated, no pilot pressures are applied to the first and second pilot chambers 54, 56 of the restricting valve 170. Namely, the pressures in these pilot chambers 54, 56 are made equal to each other, whereby the control piston 184 is advanced with the retainer 198 and returned to the non-operated or original position, under the biasing forces of the springs 196, 224. As a result, the fluid in the pulsation absorber 210 is returned to the second pilot chamber 56. While the control piston 184 is positioned between the non-operated position and the rearmost position, the retainer 190 is placed in its fully retracted position and defines the non-operated position of the control piston 184 when the piston 184 returns in the forward direction.

In the present embodiment, an abrupt depression of the brake pedal 10 will not cause a delayed increase in the wheel cylinder pressure, since the flow rate of the flow restricting valve 170 is maintained at the maximum value. Further, since the control piston 184 is moved in the cylinder bore 178 upon normal brake application, the control piston 184 is protected against sticking in the bore 178, which would occur if the piston 184 remains stationary at the same position for a long period.

If the slip ratio of the left front wheel exceeds the upper limit due to an excessively high pressure of the wheel cylinder 16 with respect to the specific friction coefficient of the road surface, the pressure of the wheel cylinder 16 is controlled in the anti-lock mode. Upon initiation of the anti-lock pressure control operation, the pressure in the first pilot chamber 54 is higher than that in the second pilot chamber 56, whereby the control piston 184 is located at a position distant from the non-operated position in the rearward direction. Therefore, when the pressure in the second pilot chamber 56 exceeds that in the first pilot chamber 54 due to the anti-lock pressure control of the wheel cylinder 16, the control piston 184 is advanced with the retainer 198 to the non-operated position, and then further advanced with the retainer 190 from the non-operated position, with the retainer 198 remaining at its fully advanced position. The control piston 184 is eventually located at a position which is determined by the pressures in the first and second pilot chambers 54, 56 and the biasing force of the spring 186. In this manner, the area or rate of fluid flow through the restricting valve 170 is eventually adjusted so as to meet the specific pressure difference between the master and wheel cylinders 14, 16. It is noted that the retainer 198 functions as a stop for defining the non-operated position of the control piston 184.

In the brake system according to the present embodiment, the pressure in the port 68 of the flow restricting valve 170 is transmitted to the second pilot chamber 56 through the pilot passage 76 and the check valve 80. Accordingly, the restricting valve 170 is always in a condition for regulating the rate of flow of the fluid toward the two-position valve 28, depending upon the pressure difference between the master and wheel cylinders 14, 16. Therefore, the wheel cylinder 16 is protected from an excessively high rate of increase in its pressure, even if the pump 40 has not yet started the delivery of the suitably pressurized fluid upon commencement of the first pressure-hold mode of operation during the anti-lock pressure control operation.

The delivery pressure of the pump 40 is applied also to the pulsation absorber 210. Since the delivery pressure of the pump 40 is considerably high, for example, 200 kg/cm$^2$, the piston 220 is moved toward the movable member 222 against the biasing action of the spring 224, and eventually comes into abutting contact with the movable member 222. Subsequently, the piston 220 and the movable member 222 are moved together against the biasing actions of the springs 224, 226, in the rearward direction from the piston 220 toward the movable member 222, until the sum of the biasing forces of the springs 224, 226 reaches a certain limit, at which the piston and movable member 220, 222 begin to move in the forward direction by the biasing forces of the springs. The reversing and advancing movements of the piston and movable member 220, 222 are repeated, whereby the pressure pulsation of the fluid delivered by the pump 40 can be reduced.

It will be understood from the above description that the flow control device of the present embodiment consists of the flow restricting valve 170, pilot passages 72, 74 and check valve 45, while the assisting means consists of the pilot passage 76 and the check valve 80 which serves as the pressure reducing means. However, the flow control device may be considered to consist of the valve 170, pilot passages 72, 76, check valve 45, and a portion of the pilot passage 74 between the point of connection to the pilot passage 76 and the second pilot chamber 56. In this instance, the assisting means is considered to consist of the check valve 80 as the pressure reducing means, and a portion of the pilot passage 74 between the points of connection to the pilot passage 76 and pump passage 44.

The present brake system having the flow control device indicated above is provided with anti-sticking means for protecting the control piston 184 from sticking in the cylinder bore 178, which anti-sticking means includes (a) first means for allowing the control piston 184 in the rearward direction, and (b) second means for maintaining the maximum area or rate of flow of the fluid from the master cylinder 14 toward the wheel cylinder 16, while the control piston 184 is located between the non-operated position and the rearmost position. The first means of the anti-sticking means includes the retainers 190, 198, shoulder surfaces 192, 200 and spring 196 of the flow restricting valve 170, and the piston 220, spring 224 and related components of the pulsation absorber 210. The second means of the anti-sticking means includes the means for defining the annular groove 62, small through-holes 60 and small apertures 61, which are dimensioned and positioned so that the rate of fluid flow through the valve 170 when the control piston 184 is placed in the non-operated position is the same as that when the piston 184 is located at a position between the non-operated position and the rearmost position. It will be understood that the pulsation absorber 210 functions as part of the anti-sticking means, as well as the pulsation reducing means for reducing the pressure pulsation of the fluid delivered from the pump 40.

Although the present invention has been described in its presently preferred embodiments with a certain degree of particularity by reference to the accompanying drawings, it is to be understood that the invention is not limited to the details of the illustrated embodiments, and that the invention may be embodied with various changes, modifications and improvements which may occur to those skilled in the art, without departing from the spirit and scope of the invention defined in the following claims. For instance, the solenoid-operated two-position valve 28 may be replaced by a solenoid-operated three-position valve.

What is claimed is:

1. An anti-lock brake system comprising:

a hydraulic power source;

a wheel cylinder for applying a brake to a wheel;

a solenoid-operated valve device disposed between said power source, and said wheel cylinder and a reservoir, and operable between a pressure-increase position thereof for fluid communication between said wheel cylinder and said power source, and a pressure-decrease position thereof for fluid communication between said wheel cylinder and said reservoir;

an electric control device electrically connected to said solenoid-operated valve device, for controlling said valve device so as to normally hold said valve device in said pressure-increase position, and upon detection of a locking state of said wheel, place said valve device in an anti-lock state in which the valve device is alternately placed in said pressure-increase and pressure-decrease position for increasing and decreasing a fluid pressure in said wheel cylinder and thereby maintaining a slip ratio of said wheel within a predetermined range;

a flow control device having a first pilot chamber which receives as a first pilot pressure the pressure in said wheel cylinder, and a second pilot chamber which receives as a second pilot pressure a pressure in one of two portions of a fluid passage connecting said power source and said solenoid-operated valve device, said two portions consisting of a first portion connecting said power source and said flow control device and a second portion connecting said flow control device and said valve device, said flow control device being normally operated in a first state for effecting a first mode of operation to allow a relatively large rate of flow of a fluid from said power source toward said wheel cylinder while said second pilot pressure is not higher than said first pilot pressure, said flow control device being brought into a second state for effecting a second mode of operation when said valve device is placed into said anti-lock state while said second pilot pressure is higher than said first pilot pressure, said flow control device in said second mode of operation decreasing the rate of flow of the fluid with an increase in a pressure difference by which a pressure in said power source is higher than a pressure in said wheel cylinder; and assisting means for enabling said flow control device to effect said first mode of operation for at least a first period between commencement of brake application to said wheel and commencement of an operation of said solenoid-operated valve device in said anti-lock state, and enabling said flow control device to effect said second mode of operation for at least a second period during which said valve device is placed in said pressure-increase position during said operation of the valve device in said anti-lock state, said assisting means operating during said first period to hold said second pilot pressure at a level not higher than said first pilot pressure, even if there arises a pressure difference between the pressure in said one of said two portions of said fluid passage and in said wheel cylinder, which pressures should be substantially equal to each other, said assisting means operating during said second period to hold said first and second pilot pressures at respective levels substantially equal to the pressures in said wheel cylinder and said power source, respectively.

2. An anti-lock brake system according to claim 1, wherein said assisting means comprises pressure reducing means provided in a pilot passage through which the pressure in said one of said two portions of said fluid passage is applied to said second pilot chamber of said flow control device, said pressure reducing means reducing said pressure in said one of said two portions by an amount larger than an amount by which the pressure in said wheel cylinder is lower than the pressure in said one of said two portions when the fluid flows into said wheel cylinder through said valve device placed in said pressure-increase position and said flow control device.

3. An anti-lock brake system according to claim 1, wherein said assisting means comprises a shut-off valve provided in a pilot passage through which the pressure in said one of said two portions of said fluid passage is applied to said second pilot chamber of said solenoid-operated valve device, said shut-off valve being held closed for at least said first period, and held open for at least said second period.

4. An anti-lock brake system according to claim 1, wherein said assisting means comprises flow restrictor means provided in a pilot passage through which the pressure in said one of said two portions of said fluid passage is applied to said second pilot chamber of said flow control device, said flow restrictor means restricting a flow of the fluid through said pilot passage and thereby delaying an increase in said second pilot chamber.

5. An anti-lock brake system according to claim 1, wherein said flow control device comprises a pilot-operated variable flow restricting valve which includes a housing, and a valve member which is substantially fluid-tightly, and slidably received in said housing, so as to cooperate with the housing to define said first and second pilot chambers, said valve member being moved based on the first and second pilot pressures, and having a non-operated position for maximizing an area of fluid flow through said flow control device from said power source toward said wheel cylinder, and a fully restricting position, said valve member being placed in said non-operated position while said second pilot pressure is not higher than said first pilot pressure, said valve member being moved in a forward direction from said non-operated position toward said fully restricting position by a distance which increases with an increase in a difference between said first and second pilot pressures, whereby said area of fluid flow decreases with an increase in said distance, while said first pilot pressure is lower than said second pilot pressure.

6. An anti-lock brake system according to claim 5, wherein said assisting means comprises pressure reducing means provided in a pilot passage through which the pressure in said one of said two portions of said fluid passage is applied to said second pilot chamber of said variable flow restricting valve, said pressure reducing means reducing said pressure in said one of said two portions by an amount larger than an amount by which the pressure in said wheel cylinder is lower than the pressure in said, one of said two portions when the fluid flows into said wheel cylinder through said valve device placed in said pressure-increase position and said variable flow restricting valve.

7. An anti-lock brake system according to claim 6, wherein said valve member of said pilot-operated variable flow restricting valve has a communication passage for fluid communication between said second pilot chamber and said one of said two portions of said fluid passage, said pressure reducing means being disposed in said communication passage.

8. An anti-lock brake system according to claim 5, wherein said flow control device further comprises a shut-off valve disposed in parallel with said pilot-operated variable restrictor valve, said shut-off valve being held open for at least said first period, and held closed for at least said second period.

9. An anti-lock brake system according to claim 8, wherein said shut-off valve is held open while said second pilot pressure is not higher than said first pilot pressure, and held closed while said first pilot pressure is lower than said second pilot pressure.

10. An anti-lock brake system according to claim 5, further comprising anti-sticking means for preventing said valve member of said pilot-operated variable flow restricting valve from being stuck in said housing, said anti-sticking means moving said valve member without influencing a braking operation while said solenoid-operated valve device is placed in said pressure-increase position, and a braking operation while said valve device is placed in said anti-lock state.

11. An anti-lock brake system according to claim 10, wherein said anti-sticking means comprises:
    means for permitting said valve member to move in a reverse direction opposite to said forward direction when said first pilot pressure becomes higher than said second pilot pressure, due to reduction of said second pilot pressure from a level of the pressure in said power source while said solenoid-operated valve device is placed in said pressure-increase position before said valve device is placed in said anti-lock state; and
    means for permitting said flow control device to maintain the maximum area of fluid flow obtained with said valve member placed in said non-operated position, even when said valve member is moved in said reverse direction from said non-operated position.

12. An anti-lock brake system according to claim 1, wherein said hydraulic power source comprises a master cylinder which delivers a pressurized fluid in response to an operation of a brake operating member, said brake system further comprising a pump for returning to said master cylinder the fluid discharged from said wheel cylinder to said reservoir through said solenoid-operated valve device,
    and wherein said second pilot chamber receives as said second pilot pressure a delivery pressure of said pump as well as said pressure in said one of said two portions of said fluid passage, said flow control device being changed from said first state to said second state when said delivery pressure applied to said second pilot chamber increases to a level near said pressure in said master cylinder applied to said first pilot chamber as said first pilot pressure,
    and wherein said assisting means includes means for applying said second pilot pressure to said second pilot chamber to change said flow control device from said first state to said second state at an optimum point of time even before said delivery pressure of said pump has increased to said level near the pressure in said master cylinder during said second period, whereby a delay of switching of said flow control device from said first state to said second state due to a delayed increase of said delivery pressure to said level near the pressure in said master cylinder is avoided.

13. An anti-lock brake system according to claim 12, wherein said flow control device comprises a pilot-operated variable flow restricting valve which includes a housing, and a valve member which is substantially fluid-tightly, and slidably received in said housing, so as to cooperate with the housing to define said first and second pilot chambers, said valve member being moved based on the first and second pilot pressures, and having a non-operated position for maximizing an area of fluid flow through said flow control device from said power source toward said wheel cylinder, and a fully restricting position, said valve member being placed in said non-operated position while said second pilot pressure is not higher than said first pilot pressure, said valve member being moved in a forward direction from said non-operated position toward said fully restricting position by a distance which increases with an increase in a difference between said first and second pilot pressures, whereby said area of fluid flow decreases with an increase in said distance, while said first pilot pressure is lower than said second pilot pressure.

14. An anti-lock brake system according to claim 12, wherein said assisting means comprises pressure reducing means provided in a pilot passage through which the pressure in said one of said two portions of said fluid passage is applied to said second pilot chamber of said flow control device, said pressure reducing means reducing said pressure in said one of said two portions by an amount larger than an amount by which the pressure in said wheel cylinder is lower than the pressure in said one of said two portions when the fluid flows into said wheel cylinder through said valve device placed in said pressure-increase position and said flow control device.

15. An anti-lock brake system according to claim 12, wherein said assisting means comprises flow restrictor means provided in a pilot passage through which the pressure in said one of said two portions of said fluid passage is applied to said second pilot chamber of said flow control device, said flow restrictor means restricting a flow of the fluid through said pilot passage and thereby delaying an increase in said second pilot chamber.

16. An anti-lock brake system according to claim 1, wherein said flow control device comprises means for decreasing an area of fluid flow therethrough with an increase in a pressure difference by which the pressure in said power source is higher than the pressure in said wheel cylinder, as well as with an increase in the pressure in said wheel cylinder.

17. An anti-lock brake system according to claim 16, wherein said flow control device comprises a pilot-operated variable flow restricting valve which includes:

- a housing having a stepped bore including a large-diameter hole, a small-diameter hole, and a shoulder surface between said large-diameter and small-diameter holes;
- a stepped control piston having a large-diameter portion, a small-diameter portion, and a shoulder surface between said large-diameter and small-diameter portions, said control piston being fluid-tightly and slidably received in said stepped bore, said control piston and said housing cooperating with each other to define a first pilot chamber in said small-diameter hole, a second pilot chamber in said large-diameter hole, and an atmospheric pressure chamber between said shoulder surfaces of said housing and said control piston, said control piston reducing an area of fluid flow therethrough in direction from said power source toward said wheel cylinder when said control piston is moved in said stepped bore in a direction from said second pilot chamber toward said first pilot chamber; and
- an elastic member for biasing said stepped control piston in a direction from said first pilot chamber toward said second pilot chamber.

* * * * *